United States Patent
Mu et al.

(10) Patent No.: US 11,503,621 B2
(45) Date of Patent: Nov. 15, 2022

(54) METHODS FOR TRANSMITTING AND RECEIVING UPLINK DATA, A USER EQUIPMENT AND A BASE STATION

(71) Applicant: NTT DoCoMo, Inc., Tokyo (JP)

(72) Inventors: Qin Mu, Beijing (CN); Liu Liu, Beijing (CN); Naoto Okubo, Tokyo (JP); Wei Xu, Beijing (CN); Yong Li, Beijing (CN); Wenbo Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/609,561

(22) PCT Filed: Mar. 7, 2018

(86) PCT No.: PCT/CN2018/078233
§ 371 (c)(1),
(2) Date: Oct. 30, 2019

(87) PCT Pub. No.: WO2018/201790
PCT Pub. Date: Nov. 8, 2018

(65) Prior Publication Data
US 2020/0154462 A1   May 14, 2020

(30) Foreign Application Priority Data

May 4, 2017 (CN) .......................... 201710309561.3

(51) Int. Cl.
*H04W 72/12* (2009.01)
*H04W 72/14* (2009.01)

(52) U.S. Cl.
CPC ... *H04W 72/1268* (2013.01); *H04W 72/1284* (2013.01); *H04W 72/14* (2013.01)

(58) Field of Classification Search
CPC ............ H04W 72/14; H04W 72/1268; H04W 72/1284
See application file for complete search history.

(56) References Cited

U.S. PATENT DOCUMENTS

| | | | | |
|---|---|---|---|---|
| 2012/0044878 | A1* | 2/2012 | Ratasuk | H04W 74/0866 370/329 |
| 2013/0128854 | A1* | 5/2013 | Nakashima | H04L 1/1861 370/329 |

(Continued)

FOREIGN PATENT DOCUMENTS

| | | |
|---|---|---|
| CN | 1363144 A | 8/2002 |
| CN | 101128024 A | 2/2008 |

(Continued)

OTHER PUBLICATIONS

International Search Report (ISR) of the international application PCT/CN2018/078233 dated May 10, 2018.

(Continued)

*Primary Examiner* — Walli Z Butt
*Assistant Examiner* — Ryan C Kavleski
(74) *Attorney, Agent, or Firm* — Osha Bergman Watanabe & Burton LLP

(57) ABSTRACT

Provided are methods for transmitting and receiving uplink data, a user equipment and a base station. The method for transmitting uplink data by a user equipment includes: transmitting to a base station a scheduling request (SR); receiving, from the base station, an uplink grant indicating scheduling information for transmitting uplink data, wherein the scheduling information is allocated by the base station according to a volume of the uplink data, the volume being determined by the SR; and transmitting to the base station the uplink data by employing the scheduling information. In (Continued)

this way, the present invention reduces power consumption and time delay during an uplink data transmission process.

16 Claims, 10 Drawing Sheets

(56) References Cited

U.S. PATENT DOCUMENTS

| | | | | |
|---|---|---|---|---|
| 2014/0153512 A1* | 6/2014 | Koskela | ................ | H04L 1/1854 370/329 |
| 2015/0117319 A1* | 4/2015 | Yang | ................... | H04W 74/004 370/329 |
| 2015/0117342 A1* | 4/2015 | Loehr | ............... | H04W 72/1284 370/329 |
| 2016/0205703 A1* | 7/2016 | Dudda | .............. | H04W 28/0278 455/452.1 |
| 2017/0006628 A1* | 1/2017 | Takahashi | ............. | H04L 5/0064 |
| 2017/0202009 A1* | 7/2017 | Kim | .................. | H04W 72/0413 |
| 2018/0020445 A1* | 1/2018 | Harada | ................ | H04W 72/04 |

FOREIGN PATENT DOCUMENTS

| | | | | |
|---|---|---|---|---|
| CN | 102316582 A | 1/2012 | | |
| WO | WO-2016186698 A1 | 11/2016 | | |
| WO | WO-2017074437 A1 * | 5/2017 | ............ | H04W 28/02 |

OTHER PUBLICATIONS

Of International Preliminary Report on Patentability issued in PCT/CN2018/078233 dated Nov. 5, 2019.

* cited by examiner

User equipment unit 20

Base station 10

METHODS FOR TRANSMITTING AND RECEIVING UPLINK DATA, A USER EQUIPMENT AND A BASE STATION

CROSS-REFERENCE TO RELATED APPLICATIONS

This application is a 371 U.S. National Stage of International Application No. PCT/CN2018/078233, filed on Mar. 7, 2018, which claims priority to Chinese Application No. 201710309561.3, filed on May 4, 2017. The entire disclosures of the above applications are incorporated herein by reference.

TECHNICAL FIELD

The present disclosure relates to a field of mobile communication, and more particularly, to a method for transmitting uplink data by a user equipment (UE), a method for receiving uplink data by a base station, and the user equipment and the base station.

BACKGROUND

In a Long Term Evolution (LTE) system, when a UE is to transmit uplink data, as shown in FIG. 17, the UE transmits to a base station a Schedule Request (SR) in step S1701. In response to the SR, the base station transmits to the UE an uplink (UL) Grant indicating scheduling information for transmitting a Buffer Status Report (BSR) in step S1702, where the BSR is used for reporting the volume of data to be transmitted by the UE to the base station. Next, the UE transmits to the base station the BSR by employing the scheduling information indicated by the UL grant in step S1703. According to the BSR, the base station may determine the volume of the data to be transmitted by the UE to the base station, so as to allocate to the UE scheduling information for transmitting the data. Subsequently, the base station returns, to the UE, a UL grant indicating the scheduling information for transmitting the data in step S1704, so that the UE may transmit the uplink data by employing the scheduling information allocated by the base station in step S1705.

In a Narrowband Internet of Things (NB-IoT) system, the UE can also transmit the uplink data by the above-described process. Furthermore, in order to expand coverage, repeated transmissions may be performed in the respective steps of the above-described process. However, with respect to the NB-IoT, especially in a case of repetition in order to expand the coverage, power consumption and time delay caused by applying the above-described process are obvious. In addition, in the NB-IoT system, the volume of the data to be transmitted by the UE to the base station is smaller as compared with the LTE system. Therefore, in the above-described process, overhead caused by the UE transmitting the BSR and the base station transmitting the UL grant is larger than the volume of the data to be transmitted.

SUMMARY

According to an embodiment of the present disclosure, there is provided a method for transmitting uplink data by a user equipment, comprising: transmitting to a base station a schedule request (SR); receiving, from the base station, an uplink grant indicating scheduling information for transmitting uplink data, wherein the scheduling information is allocated by the base station according to a volume of the uplink data, the volume being determined by the SR; and transmitting to the base station the uplink data by employing the scheduling information.

According to another embodiment of the present disclosure, there is provided a user equipment, comprising: a transmitting unit configured to transmit to a base station a schedule request (SR); a receiving unit configured to receive, from the base station, an uplink grant indicating scheduling information for transmitting uplink data, wherein the scheduling information is allocated by the base station according to a volume of the uplink data, the volume being determined by the SR; and the transmitting unit further configured to transmit to the base station the uplink data by employing the scheduling information.

According to another embodiment of the present disclosure, there is provided a method for receiving uplink data by a base station, comprising: receiving, from a user equipment, a schedule request (SR); transmitting, to the user equipment, an uplink grant indicating scheduling information for transmitting uplink data, wherein the scheduling information is allocated by the base station according to a volume of the uplink data, the volume being determined by the SR; and receiving, from the user equipment, the uplink data transmitted by employing the scheduling information.

According to another embodiment of the present disclosure, there is provided a base station, comprising: a receiving unit configured to receive, from a user equipment, a schedule request (SR); and a transmitting unit configured to transmit, to the user equipment, an uplink grant indicating scheduling information for transmitting uplink data, wherein the scheduling information is allocated by the base station according to a volume of the uplink data, the volume being determined by the SR, wherein the receiving unit is further configured to receive, from the user equipment, the uplink data transmitted by employing the scheduling information.

According to another embodiment of the present disclosure, there is provided a method for transmitting uplink data by a user equipment, comprising: transmitting to a base station a schedule request; and transmitting to the base station uplink data, wherein an end of uplink data transmission is indicated by information bits in the uplink data or not transmitting uplink data in a predetermined time period.

According to another embodiment of the present disclosure, there is provided a user equipment, comprising: a transmitting unit configured to transmit to a base station a schedule request and transmit to the base station uplink data, wherein an end of uplink data transmission is indicated by information bits in the uplink data or not transmitting uplink data in a predetermined time period.

According to another embodiment of the present disclosure, there is provided a method for receiving uplink data by a base station, comprising: receiving from a user equipment a schedule request; receiving from the user equipment the uplink data until an end of uplink data transmission, wherein an end of uplink data transmission is indicated by an end tag in the uplink data or not receiving uplink data in a predetermined time period.

According to another embodiment of the present disclosure, there is provided a base station, comprising: a receiving unit configured to receive from a user equipment a schedule request and receive from the user equipment uplink data until an end of uplink data transmission, wherein an end of uplink data transmission is indicated by an end tag in the uplink data or not receiving uplink data in a predetermined time period.

BRIEF DESCRIPTION OF THE DRAWINGS

By describing embodiments of the present disclosure in detail in conjunction with the accompanying drawings, the above and other objects, features and advantages of the present disclosure will become clearer. The accompanying drawings are provided for further understanding the embodiments of the present disclosure and constitute a part of the specification, which are used for explaining the present disclosure together with the embodiments of the present disclosure rather than limiting the present disclosure. In the accompanying drawings, same reference signs usually denote same components or steps.

DETAILED DESCRIPTION

In order to make objects, technical solutions and advantages of the present disclosure clearer, the exemplary embodiments of the present disclosure will be described in detail with reference to the accompanying drawings. It is obvious that the described embodiments are just a part but not all of embodiments of the present disclosure. It should be understood that, the present disclosure is not limited by the exemplary embodiments described here. Based on the described embodiments herein, other embodiments obtained by those skilled in the art without any inventive work should be within the scope of the present disclosure.

Hereinafter, the embodiments of the present disclosure will be described in the context of a NB-IoT. However, it will be apparent to those skilled in the art that the embodiments of the present disclosure may be applied to various communication systems.

Figure 1:
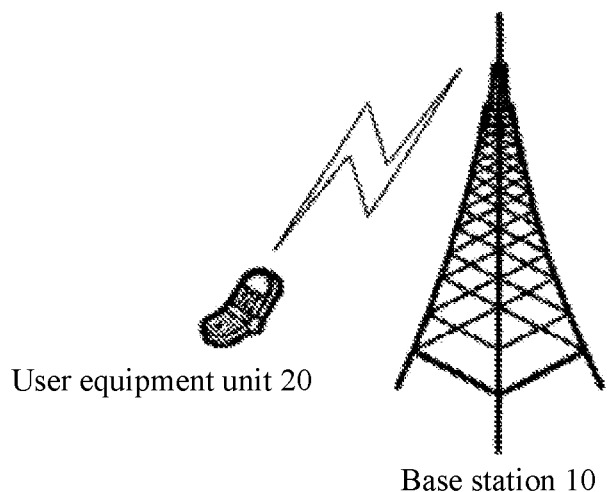
FIG. 1 shows a schematic diagram of a NB-IoT system in which embodiments of the present disclosure may be used.

FIG. 1 shows a schematic diagram of a NB-IoT system in which embodiments of the present disclosure may be used. As shown in FIG. 1, the NB-IoT system includes a base station 10 and a user equipment 20, where, the user equipment 20 transmits to the base station 10 various uplink control information and/or uplink data, and the base station 10 receives the uplink control information and/or the uplink data and transmits to the user equipment 20 downlink control information and/or downlink data. It should be noted that, although only one base station and one user equipment are shown in FIG. 1, it is merely illustrative, and there may be more base stations and/or user equipments in the system.

Hereinafter, the embodiments of the present disclosure will be described with reference to the accompanying drawings.

In a first embodiment of the present disclosure, scheduling information employed by a UE to transmit a buffer status report (BSR) may be indicated to a base station by employing a schedule request (SR), so that the base station may receive the BSR on the scheduling information, or indicate the volume of uplink data to be transmitted by the UE to the base station.

Figure 2:
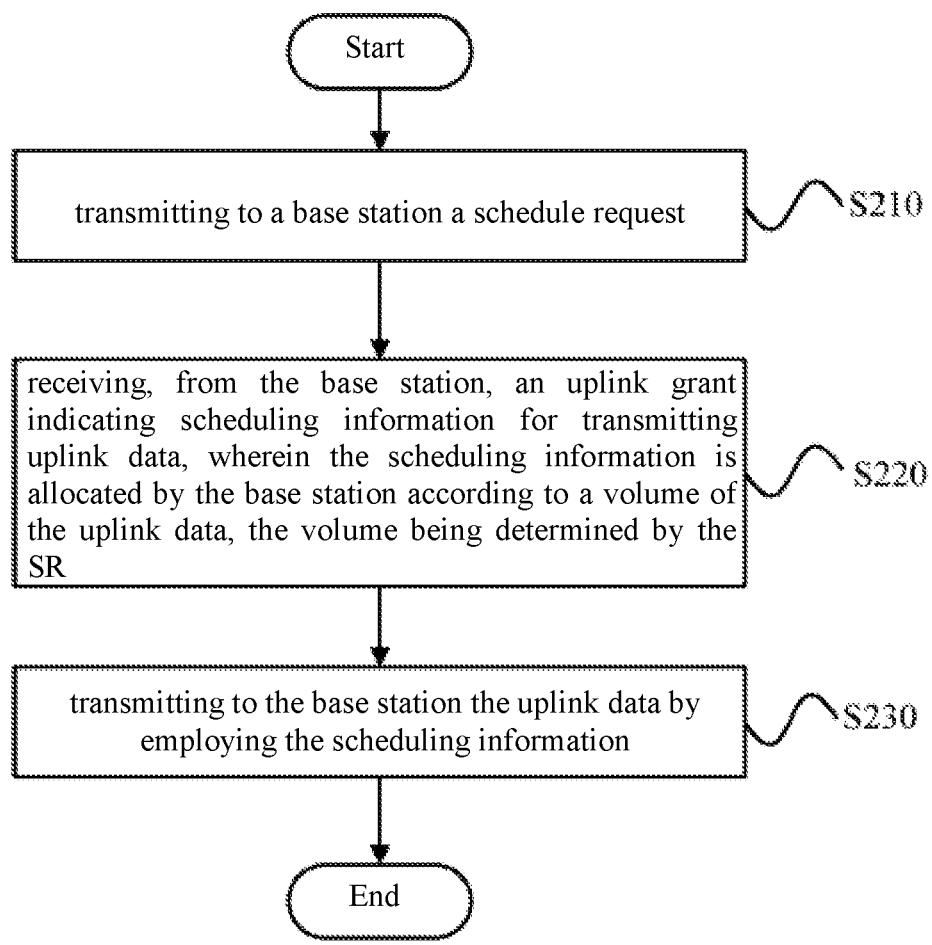
FIG. 2 shows a schematic flow chart of a method for transmitting uplink data by a user equipment according to a first embodiment of the present disclosure.

FIG. 2 shows a schematic flow chart of a method 200 for transmitting uplink data by a user equipment according to the first embodiment of the present disclosure.

As shown in FIG. 2, in step S210, a SR is transmitted to a base station.

In step S220, a UL grant indicating scheduling information for transmitting uplink data is received from the base station, where, the scheduling information is allocated by the base station according to the volume of the uplink data, the volume being determined by the SR.

In S230, the uplink data is transmitted to the base station by employing the scheduling information.

In a first implementation mode of the first embodiment of the present disclosure, the SR indicates scheduling information for a buffer status report (BSR), where, the BSR is a report for indicating the volume of the whole uplink data to be transmitted by the UE to the base station. The scheduling information for the BSR may include the number of repeated transmissions of the BSR (i.e., the number of repetitions of the BSR) and/or a Modulation and Coding Scheme (MSC) and the like. However, the embodiments of the present disclosure are not limited thereto. The base station may acquire the scheduling information employed by the UE to transmit the BSR by the SR, without allocating the scheduling information for the BSR, so that the UL grant indicating the scheduling information for the BSR may not be transmitted to the UE. Thereafter, the UE transmits to the base station the BSR, and then the base station determines the volume of uplink data to be transmitted by the UE according to the BSR and allocates corresponding scheduling information.

Figure 3:
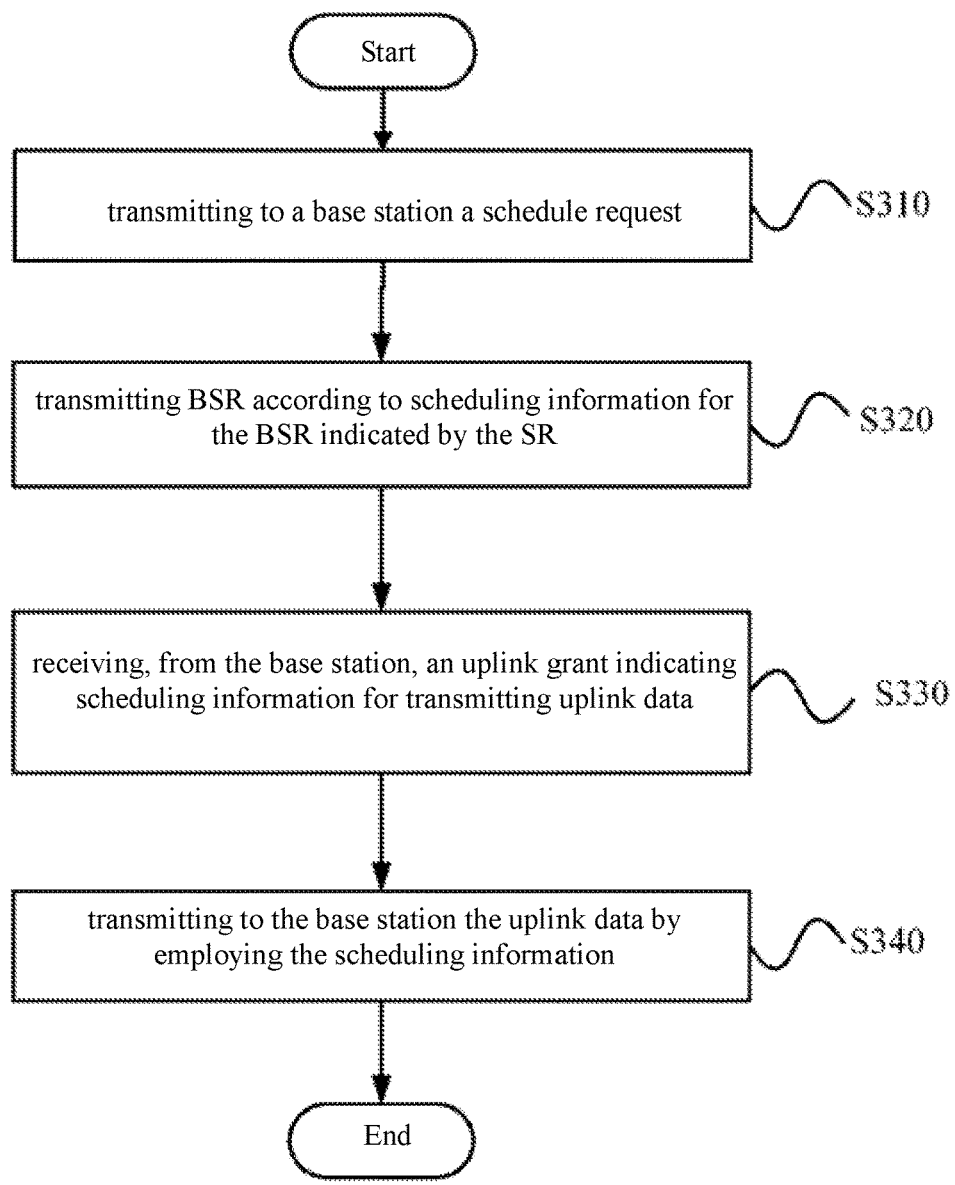
FIG. 3 shows a schematic flow chart of a method for transmitting uplink data according to a first implementation mode of the first embodiment of the present disclosure.

FIG. 3 shows a schematic flow chart of a method 300 for transmitting uplink data according to the first implementation mode of the first embodiment of the present disclosure. The method can be performed by a user equipment.

As shown in FIG. 3, in step S310, the UE transmits to a base station a SR. The step corresponds to the above-described step S210. In the implementation mode, the SR indicates scheduling information for a BSR.

In one example, the scheduling information for the BSR may be explicitly indicated by the SR. Specifically, information bits for indicating the scheduling information for the BSR may be padded or set in the SR. The number of padded information bits may be appropriately determined according to content of the scheduling information to be transmitted. In the example where the scheduling information includes the MCS and the number of repetitions, the MCS (specifically, an index of the MCS) may be indicated by employing a bit(s) padded on the SR, and the number of repetitions may be indicated by employing b bit(s) padded on the SR, where a and b are integers greater than or equal to 1. For example, the MCS for the BSR may be indicated by employing 1 (a=1) bit, and the number of repetitions may be indicated by employing 3 (b=3) bits, as shown in Table 1 and Table 2 below. However, the embodiments of the present disclosure are not limited thereto. The size and content of bit information and a combination thereof may be appropriately modified according to content of the scheduling information. For example, a combination of the MCS and the number of repetitions for the BSR may be represented by c bits, such that each value of the c bits corresponds to one combination of the MCS and the number of repetitions for the BSR, as shown in Table 3.

TABLE 1

| Bit | MCS for BSR |
|---|---|
| 0 | BPSK |
| 1 | QPSK |

TABLE 2

| Bit | The number of repetitions for BSR |
|---|---|
| 000 | 1 |
| 001 | 2 |
| 010 | 4 |
| 011 | 16 |
| . . . | . . . |

TABLE 3

| Bit | MCS + the number of repetitions for BSR |
|---|---|
| 0000 | BPSK + 1 |
| 0001 | BPSK + 2 |
| 0010 | BPSK + 4 |
| 0011 | BPSK + 16 |
| 0100 | QPSK + 1 |
| 0101 | QPSK + 2 |
| . . . | . . . |

In another example, the scheduling information for the BSR may be implicitly indicated by the SR. For example, the scheduling information for the BSR may be implicitly indicated by resources for transmitting the SR. The resources may include one or more types of time resources, frequency resources and code resources for transmitting the SR.

For example, a mapping relationship may be established between the code resources for transmitting the SR and the scheduling information for the BSR, such that each code corresponds to one type of scheduling information for the BSR, as shown in Table 4. In the table, the code resources are embodied as a sequence for scrambling the SR.

TABLE 4

| Sequence index | Scheduling information (MCS and the number of repetitions) for BSR |
|---|---|
| 0 | BPSK, 1 |
| 1 | BPSK, 2 |
| 2 | BPSK, 4 |
| 3 | BPSK, 16 |
| 4 | QPSK, 1 |
| 5 | QPSK, 2 |
| 6 | QPSK, 4 |
| 7 | QPSK, 16 |
| . . . | . . . |

Moreover, for example, the scheduling information may be indicated by employing the frequency resources (for example, subcarriers) for transmitting the SR. Usually, the base station allocates a group of subcarriers to the UE, so as to transmit the SR. A mapping relationship may be established between the scheduling information for the BSR and the respective subcarriers. For example, a first type of scheduling information for the BSR (for example, the MCS is BPSK and the number of repetitions is 1) is indicated in the SR transmitted by subcarrier 0, and a second type of scheduling information for the BSR (for example, the MCS is BPSK and the number of repetitions is 2) is indicated in the SR transmitted by subcarrier 1, so on and so forth. Thus, the base station may determine the scheduling information for the BSR by the SR received on different subcarriers.

Figure 4:
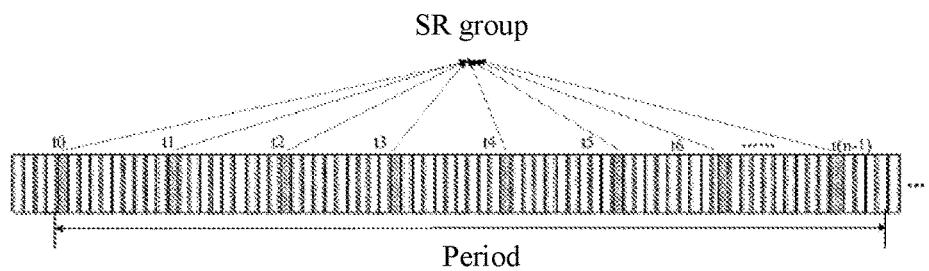
FIG. 4 shows a schematic diagram of indicating scheduling information for a BSR by employing time resources for transmitting a SR.

Moreover, for example, the scheduling information for the BSR may be indicated by employing the time resources (for example, subframes) for transmitting the SR. FIG. 4 shows a schematic diagram of indicating the scheduling information for the BSR by employing the time resources for transmitting the SR. Specifically, in a time domain, the time resources (for example, the subframes) for transmitting the SR may be grouped, according to the number n of types of scheduling information (for example, n is the number of combinations of MCS and the number of repetitions, and is an integer greater than or equal to 1), where each group has n time resources, so that a mapping relationship can be established between the scheduling information for the BSR and the time resources (for example, the subframes) for transmitting the SR. For example, the mapping relationship may be established, such that a SR transmitted by a first time resource (subframe t0) in the SR group indicates the first type of scheduling information for the BSR (for example, the MCS is BPSK and the number of repetitions is 1), a SR transmitted by a second time resource (subframe t1) in the SR group indicates the second type of scheduling information for the BSR (for example, the MCS is BPSK and the number of repetitions is 2), so on and so forth. Therefore, when receiving the SR, the base station may determine the scheduling information for the BSR according to the time resources (the subframes) employed by the SR. In this case, it is assumed that the number of pieces of scheduling information to be indicated is m, m is an integer greater than or equal to 1, and an interval among the n time resources for transmitting the SR is SR_period. Thus, a maximum time required for indicating the whole scheduling information is SR_period*m.

In addition to employing one type of the time resources, the frequency resources and the code resources for transmitting the SR to indicate the scheduling information for the BSR, a combination of two or three types of the time resources, the code resources and the frequency resources for transmitting the SR may also be employed to indicated the scheduling information for the BSR.

Figure 5:
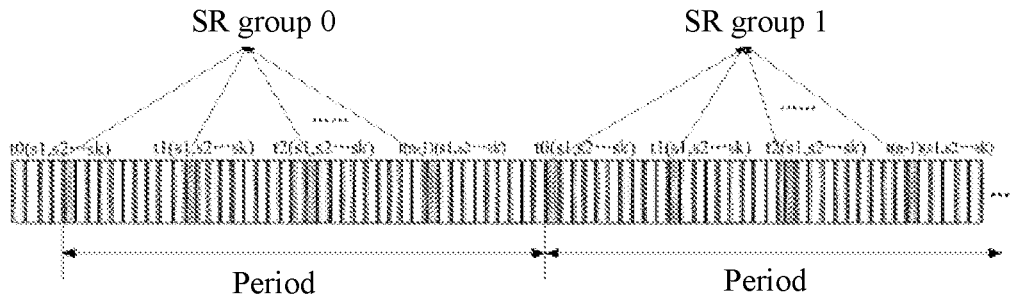
FIG. 5 shows a schematic diagram of indicating the scheduling information for the BSR by employing a combination of the time resources and code resources for transmitting the SR.

FIG. 5 shows a schematic diagram of indicating the scheduling information for the BSR by employing a combination of the time resources and the code resources (the sequences) for transmitting the SR. As shown in FIG. 5, it is assumed that the number of sequences available for transmitting the SR is k, and k is an integer greater than or equal to 2. The SR can map different scheduling information for the BSR to different combinations of the time resources and the sequences. For example, the SR transmitted by employing sequence s1 in subframe t0 indicates the first type of scheduling information for the BSR (for example, the MCS is BPSK and the number of repetitions is 1), and the SR transmitted by employing sequence s2 in subframe t0 indicates the second type of scheduling information for the BSR (for example, the MCS is BPSK and the number of repetitions is 2), . . . , a SR transmitted by employing sequence sk in subframe t(n−1) indicates an $(n-1)^{th}$ type of scheduling information for the BSR (for example, the MCS is QPSK and the number of repetitions is 16), so on and so forth. Therefore, the base station may determine the scheduling information for the BSR according to the time resources and sequences for the SR. In the case of FIG. 5, a maximum time required to indicate the whole scheduling information is SR_period*m/k, which is shortened as compared with the case of FIG. 4.

It should be noted that, although the scheduling information and various combinations are described above with the MCS and the number of repetitions as an example, it is not limitative. The scheduling information may include other items, and accordingly, there may be other combinations.

Returning to FIG. 3, in step S320, the UE transmits to the base station the BSR by employing the scheduling information for the BSR indicated by the SR. Therefore, the base station does not need to transmit to the UE the uplink grant for transmitting the scheduling information for the BSR.

Then, in step S330, the UE receives, from the base station, the UL grant indicating scheduling information for transmitting the uplink data.

Specifically, after receiving the BSR, the base station may process (demodulate and decode, etc.) the BSR according to the scheduling information indicated by the SR received in step S310, and determine the volume of uplink data reported by the BSR to be transmitted by the UE to the base station. Then, the base station may allocate to the UE uplink scheduling information, so that the UE may transmit the uplink data by employing the scheduling information. The base station may notify the user equipment of the allocated scheduling information by transmitting the UL grant to the UE. Therefore, in the implementation mode, it may be considered that the base station determines the volume of the uplink data by the SR, and correspondingly allocates the scheduling information. In other words, step S320 and step S330 may correspond to step S220 shown in FIG. 2.

In step S340, the UE transmits to the base station the uplink data by employing the scheduling information. The step may correspond to step S230 described in FIG. 2.

In the first implementation mode, as described above, the UE notifies the base station of the scheduling information for the BSR by the SR, and subsequently transmits to the base station the BSR by employing the scheduling information. Thus, the base station is no longer required to determine the scheduling information for the BSR and transmit the scheduling information to the UE by the UL grant, and thus, step S1702 shown in FIG. 17 can be omitted, thereby simplifying the flow.

Returning to FIG. 2, in a second implementation mode according to the first embodiment of the present disclosure, the SR indicates the volume of the uplink data (the whole uplink data) to be transmitted by the UE to the base station.

Figure 6:
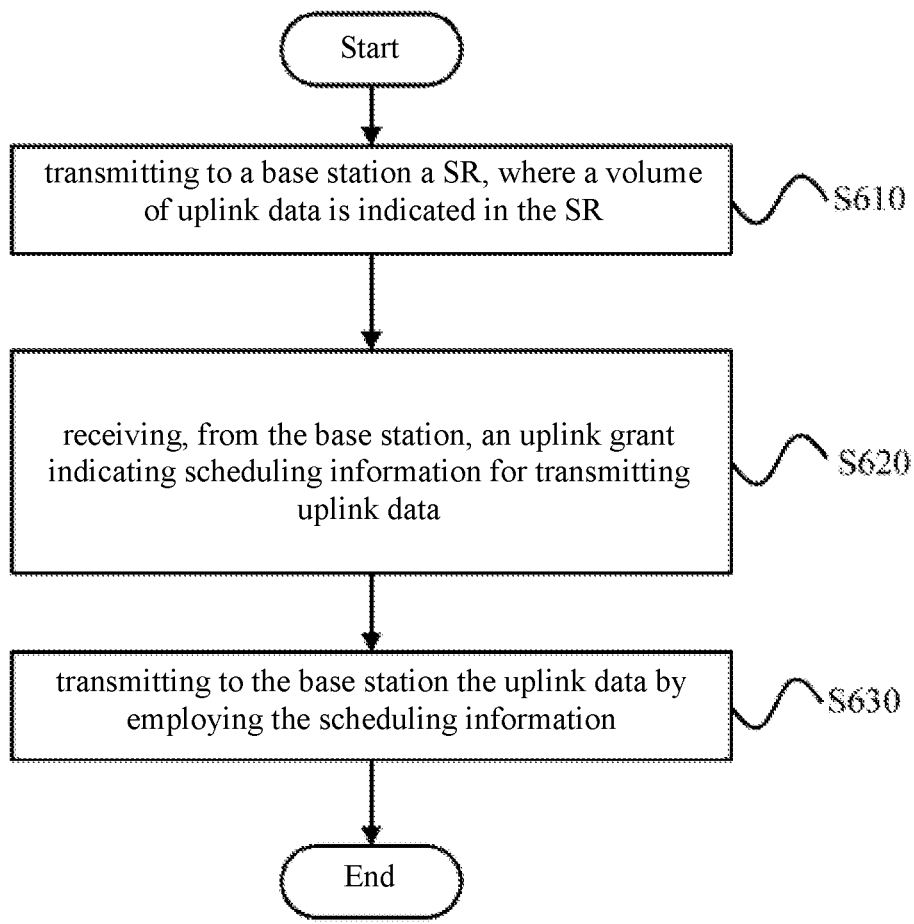
FIG. 6 shows a schematic flow chart of a method for transmitting uplink data by a user equipment according to a second implementation mode of the first embodiment of the present disclosure.

FIG. 6 shows a schematic flow chart of a method 600 for transmitting uplink data by a user equipment according to the second implementation mode of the first embodiment of the present disclosure.

As shown in FIG. 6, in S610, the UE transmits to a base station a SR, where the volume of uplink data is indicated in the SR. The step may correspond to step S210 shown in FIG. 2.

In the NB-IoT system, the volume of data (DV) may be divided into 16 types, where each type is allocated a DV index, as shown in Table 5 below. Of course, this is merely illustrative.

TABLE 5

| Index | DV (byte) |
| --- | --- |
| 0 | DV = 0 |
| 1 | 0 < DV ≤ 10 |
| 2 | 10 < DV ≤ 14 |
| 3 | 14 < DV ≤ 19 |
| 4 | 19 < DV ≤ 26 |
| 5 | 26 < DV ≤ 36 |
| 6 | 36 < DV ≤ 49 |
| 7 | 49 < DV ≤ 67 |
| 8 | 67 < DV ≤ 91 |
| 9 | 91 < DV ≤ 125 |
| 10 | 125 < DV ≤ 171 |
| 11 | 171 < DV ≤ 234 |
| 12 | 234 < DV ≤ 321 |
| 13 | 321 < DV ≤ 768 |
| 14 | 768 < DV ≤ 1500 |
| 15 | DV ≥ 1500 |

In one example, the SR may explicitly indicate the volume of the uplink data. Specifically, information bits for indicating the volume of the uplink data may be padded or set in the SR. The padded information bits may directly indicate the volume of the uplink data, for example, as shown in Table 6, and may also indicate an index corresponding to each volume, for example, one of indexes 0 to 15 as shown in Table 5.

TABLE 6

| Bit information | DV (byte) |
| --- | --- |
| 0000 | DV = 0 |
| 0001 | 0 < DV ≤ 10 |
| 0010 | 10 < DV ≤ 14 |
| 0011 | 14 < DV ≤ 19 |
| . . . | . . . |

In another example, the SR may implicitly indicate the volume of the uplink data. Specifically, the volume of the uplink data may be indicated by resources for transmitting the SR, and the resources for transmitting the SR include at least one type of time resources, frequency resources and code resources for transmitting the SR. For example, the volume of the uplink data may be indicated by code resources (sequences) for transmitting the SR, for example, as shown in Table 7 below, or the volume of the uplink data may also be indicated by a combination of the code resources (the sequences) and frequency resources (subcarriers), for example, as shown in Table 8 below.

TABLE 7

| Sequence index | DV (byte) |
| --- | --- |
| 0 | DV = 0 |
| 1 | 0 < DV ≤ 10 |
| 2 | 10 < DV ≤ 14 |
| 3 | 14 < DV ≤ 19 |
| ... | ... |

TABLE 8

| | Sequence index | | | |
| --- | --- | --- | --- | --- |
| Subcarrier | Sequence 1 | Sequence 2 | Sequence 3 | Sequence 4 |
| | | DV (byte) | | |
| Subcarrier 1 | DV = 0 | 0 < DV ≤ 10 | 10 < DV ≤ 14 | 14 < DV ≤ 19 |
| Subcarrier 2 | 19 < DV ≤ 26 | 26 < DV ≤ 36 | 36 < DV ≤ 49 | 49 < DV ≤ 67 |
| Subcarrier 3 | 67 < DV ≤ 91 | 91 < DV ≤ 125 | 125 < DV ≤ 171 | 171 < DV ≤ 234 |
| Subcarrier 4 | 234 < DV ≤ 321 | 321 < DV ≤ 768 | 768 < DV ≤ 1500 | DV > 1500 |

A mode of indicating the volume of the uplink data by the resources for transmitting the SR is similar to the mode of indicating the scheduling information for the BSR by the resources for transmitting the SR as described above with reference to FIG. 4 and FIG. 5, and no details will be repeated here.

Further referring to FIG. 6, in S620, an uplink grant indicating scheduling information for transmitting the uplink data is received from the base station. The step may correspond to step S220 described above with reference to FIG. 2.

Specifically, after receiving the SR, the base station may determine the volume of the uplink data to be transmitted by the UE to the base station. Then, the base station may allocate to the UE the uplink scheduling information, so that the UE may transmit the uplink data by employing the scheduling information. The base station may notify the user equipment of the allocated scheduling information by transmitting the UL grant to the UE.

In S630, the uplink data is transmitted to the base station by employing the scheduling information.

In the second implementation mode, as described above, the UE notifies the base station of the volume of the uplink data to be transmitted to the base station by the SR, so that the base station is no longer required to determine the scheduling information for the BSR and transmit the scheduling information to the UE by the UL grant. Moreover, the UE is not required to transmit the BSR. Thus, step S1702 and step S1703 shown in FIG. 17 may be omitted, thereby simplifying the flow.

Returning to FIG. 2, in a third implementation mode according to the first embodiment of the present disclosure, the SR indicates whether the volume of the whole uplink data to be transmitted by the user equipment is greater than a threshold. The threshold may be predetermined between the user equipment and the base station.

Figure 7:
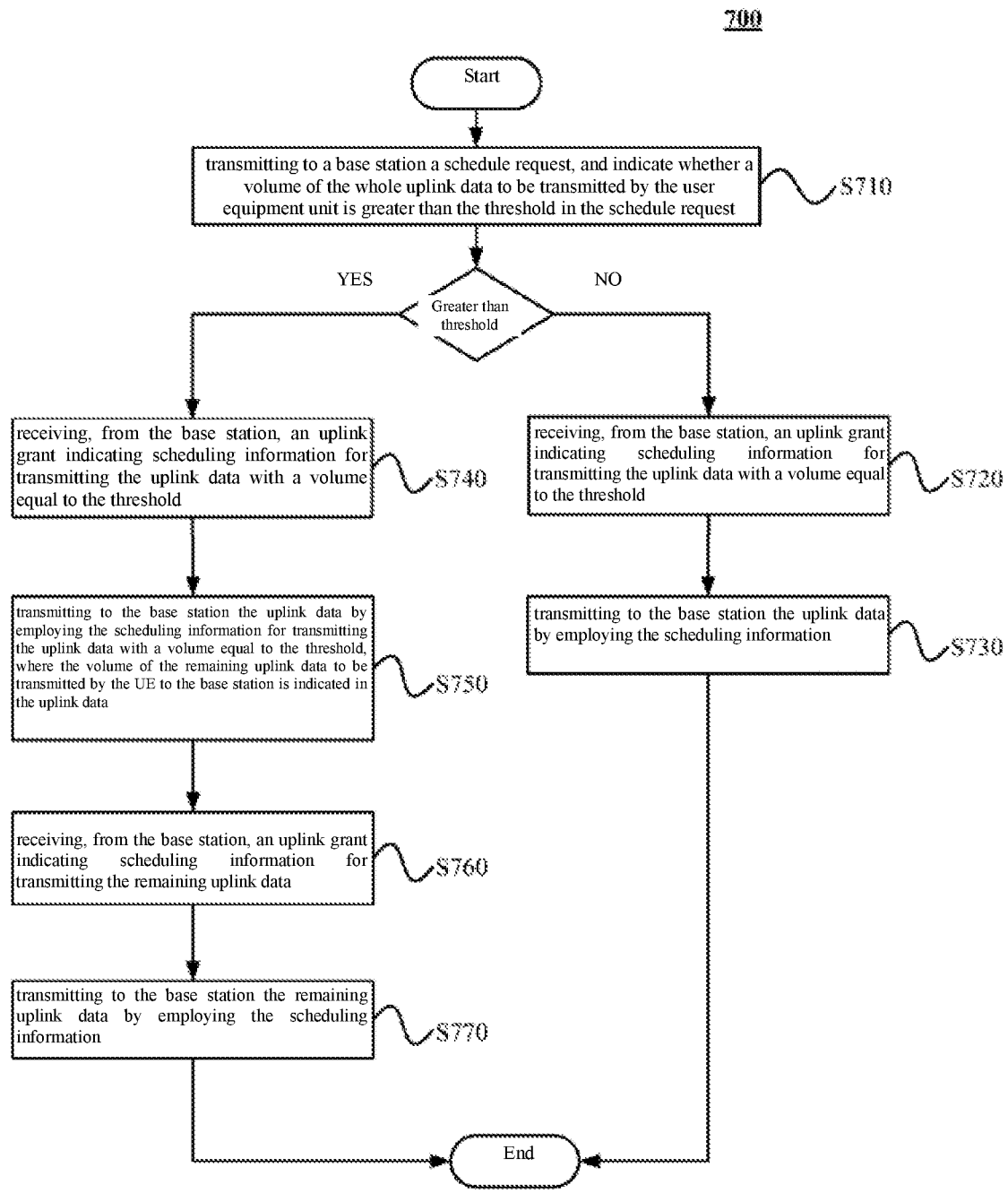
FIG. 7 shows a schematic flow chart of a method for transmitting uplink data by a user equipment according to a third implementation mode of the first embodiment of the present disclosure.

FIG. 7 shows a schematic flow chart of a method 700 for transmitting uplink data according to the third implementation mode of the first embodiment of the present disclosure. The method may be performed by a user equipment.

As shown in FIG. 7, in step S710, the UE transmits to a base station a SR, the SR indicating whether the volume of whole uplink data to be transmitted by the user equipment is greater than a threshold. The step may correspond to step S210 shown in FIG. 2. The SR may explicitly or implicitly indicate whether the volume of the whole uplink data to be transmitted by the user equipment is greater than the threshold.

In one example, the SR may explicitly indicate whether the volume of the whole uplink data to be transmitted is greater than the threshold. Specifically, information bits for indicating whether the volume of the whole uplink data to be transmitted is greater than the threshold may be padded or set in the SR. For example, 1 bit may be employed to indicate whether the volume of the whole uplink data to be transmitted is greater than the threshold. Specifically, when the bit is "0", it indicates that the volume of the whole uplink data to be transmitted is not greater than the threshold, and when the bit is "1", it indicates that the volume of the whole uplink data to be transmitted is greater than the threshold.

In another example, the SR may implicitly indicate whether the volume of the whole uplink data to be transmitted is greater than the threshold. Specifically, resources for transmitting the SR may be employed to indicate whether the volume of the whole uplink data to be transmitted is greater than the threshold, and the resources for transmitting the SR include at least one type of time resources, frequency resources and code resources for transmitting the SR. For example, a corresponding relationship may be established between the time resources, the frequency resource, the code resources, or some combination thereof for transmitting the SR, and whether the volume of the whole uplink data to be transmitted is greater than the threshold, such that one type of the time resources, the frequency resources and the code resources or a combination thereof corresponds to that the volume of the whole uplink data to be transmitted is greater than the threshold, while another type of the time resources, the frequency resources and the code resources or a combination thereof corresponds to that the volume of the whole uplink data to be transmitted is not greater than the threshold. A mode of indicating whether the volume of the whole uplink data to be transmitted is greater than the threshold by the resources for transmitting the SR is similar to the mode of indicating the scheduling information for the BSR by the resources for transmitting the SR as described above with reference to FIG. 4 and FIG. 5, and no details will be repeated here.

Returning to FIG. 7, when the base station determines that the volume of the whole uplink data to be transmitted by the user equipment is not greater than the threshold according to the SR, the base station may allocate scheduling information for transmitting the uplink data according to the threshold.

For example, the base station may allocate scheduling information to the uplink data with a volume equal to the threshold. Therefore, in step S720, an uplink grant indicating the scheduling information for transmitting the uplink data with a volume equal to the threshold is received from the base station. That is, in this case, the scheduling information employed in step S220 is allocated by the base station according to the threshold. Then, in step S730, the UE may transmit to the base station the whole uplink data by employing the scheduling information.

When the volume of the whole uplink data to be transmitted by the user equipment is greater than the threshold, the base station may allocate scheduling information to the uplink data with a volume equal to the threshold, so that the UE may firstly transmit to the base station the uplink data with a volume equal to the threshold by employing the scheduling information. In this case, in step S740, the uplink grant indicating the scheduling information for transmitting the uplink data with a volume equal to the threshold is received from the base station. Then, in order to notify the base station of the volume of remaining uplink data, in step S750, the UE transmits to the base station the uplink data (that is, the uplink data with a volume equal to the threshold) by employing the scheduling information allocated by the base station, and when transmitting the uplink data, the UE may also indicate the volume of the remaining uplink data to be transmitted by the UE to the base station by employing the transmitted uplink data. The volume of the remaining uplink data to be transmitted by the UE to the base station may be explicitly or implicitly indicated in the uplink data. It should be noted that, although it is described here that the base station allocates scheduling information for the uplink data with a volume equal to the threshold, it is merely illustrative. The base station may also allocate scheduling information for uplink data with other volume (e.g., less than the threshold).

The volume of the remaining uplink data may be explicitly indicated in the uplink data. In one example, the volume of the remaining uplink data may be indicated by padding additional information bits in the uplink data. As described above, referring to Table 4, the information bits may be employed to indicate the volume of the remaining uplink data, and may also indicate an index number corresponding to the volume of the remaining uplink data.

The volume of the remaining uplink data may also be implicitly indicated in the uplink data. In another example, the volume of the remaining uplink data may be indicated by employing a sequence for scrambling the uplink data. For example, a corresponding relationship may be established between the sequence and the volume of the remaining uplink data, such that each sequence may indicate the corresponding volume of the remaining uplink data. As an example of the scrambling sequence, the uplink data may be scrambled by employing a sequence $c(n)$, $n=0, 1, 2, \ldots, M_{PN}-1$ where, $M_{PN}$ is a length of the sequence $c(n)$, and $c(n)$ is determined according to a Gold sequence having a length of 31, by employing Equation 1 below.

$$c(n)=(x_1(n+N_C)+x_2(n+_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{Equation 1}$$

A symbol "mod" indicates a modulo operation, $N_C=1600$, a first sequence $x_1(n)$ is initialized by employing $x_1(0)=1$, $x_1(n)=0$, $n=1, 2, \ldots, 30$, and a second sequence $x_1(n)$ is initialized by employing Equation 2 and Equation 3 below.

$$c_{init}=\text{Seq}(DV\_\text{remaining}) \cdot 2^{14}+q \cdot 2^{13}+\lfloor n_s/2 \rfloor \cdot 2^9+N_{ID}^{cell} \quad \text{Equation 2}$$

$$c_{init}=\Sigma_{i=0}^{30} x_2(i) \cdot 2^i \quad \text{Equation 3}$$

$c_{init}$ represents an initial value of $c(n)$, q is a sequence number of a codeword, $q \in \{0,1\}$, $n_s$ is a slot number in a radio frame, $N_{ID}^{cell}$ is a cell identifier (ID), and Seq(DV_remaining) represents a sequence related to the volume of the remaining uplink data. It can be seen that each sequence corresponds to a volume of remaining uplink data, so as to indicate the corresponding volume of remaining uplink data. It should be noted that the embodiments of the present disclosure are not limited thereto. Other sequences may also be employed to implicitly indicate the volume of the remaining uplink data.

When the base station receives the uplink data transmitted by the UE that indicates the volume of the remaining uplink data, the base station obtains the volume of the remaining uplink data by demodulating/decoding the uplink data, allocates scheduling information for transmitting the remaining uplink data, and transmits to the user equipment an uplink grant indicating the scheduling information for transmitting the remaining uplink data.

Returning to FIG. 7, in step S760, the UE receives, from the base station, an uplink grant indicating the scheduling information for transmitting the remaining uplink data, and in step S750, the UE transmits to the base station the remaining uplink data by employing the scheduling information.

In the schematic flow chart shown in FIG. 7, step S710 may correspond to step S210 in FIG. 2, step S720 and step S740 may correspond to step S220 in FIG. 2, and step S730 and step S750 to step S770 may correspond to step S230 in FIG. 2.

In the third implementation mode, as described above, the UE notifies the base station of whether the volume of the whole uplink data to be transmitted is greater than the threshold by the SR, so that the base station is no longer required to determine the scheduling information for the BSR and transmit the scheduling information to the UE by the UL grant, and the UE is not required to transmit the BSR. Thus, step S1702 and step S1703 shown in FIG. 17 may be omitted, thereby simplifying the flow.

Returning to FIG. 2, in a fourth implementation mode according to the first embodiment of the present disclosure, the SR indicates the volume of a part of the whole uplink data to be transmitted by the user equipment.

Figure 8:
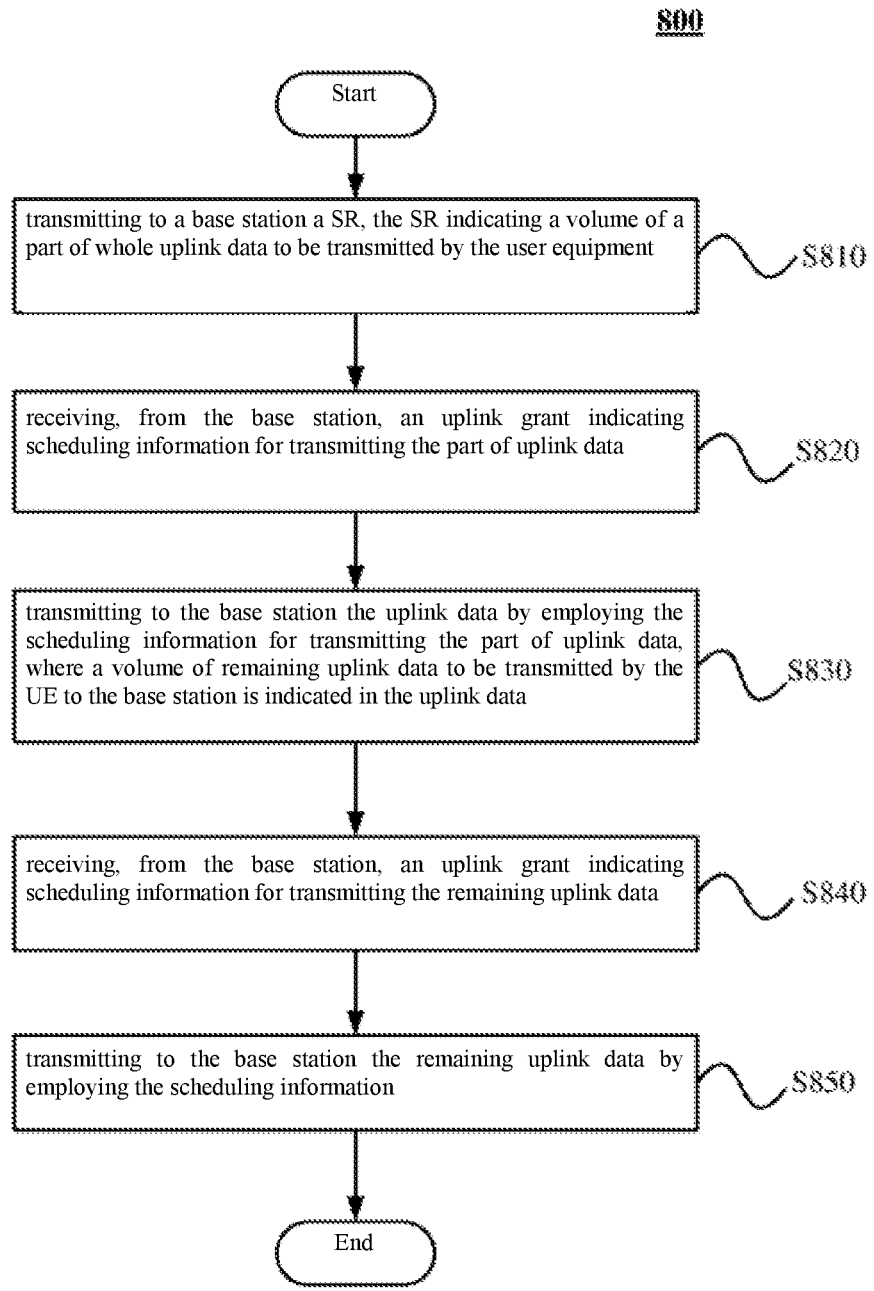
FIG. 8 shows a schematic flow chart of a method for transmitting uplink data by a user equipment according to a fourth implementation mode of the first embodiment of the present disclosure.

FIG. 8 shows a schematic flow chart of a method 800 for transmitting uplink data according to the fourth implementation mode of the first embodiment of the present disclosure. The method may be performed by a user equipment.

As shown in FIG. 8, in step S810, the UE transmits to a base station a SR, the SR indicating the volume of a part of whole uplink data to be transmitted by the user equipment. The step may correspond to step S210 shown in FIG. 2. The SR may explicitly or implicitly indicate the volume of a part of the whole uplink data to be transmitted by the user equipment.

In one example, the volume of a part of the whole uplink data to be transmitted may be explicitly indicated. Specifically, information bits for indicating the volume of a part of the whole uplink data to be transmitted may be padded or set in the SR. For example, bit information of 2 bits may be employed to indicate the volume of a part of the whole uplink data to be transmitted. Specifically, when the bit information is "00", it indicates a first volume of uplink data; when the bit information is "01", it indicates a second volume of uplink data; when the bit information is "10", it indicates a third volume of uplink data; and when the bit information is "11", it indicates a fourth volume of uplink data. Of course, the embodiments of the present disclosure are not limited thereto.

In another example, the volume of a part of the whole uplink data to be transmitted may be implicitly indicated. Specifically, the volume of a part of the whole uplink data to be transmitted may be indicated by resources for transmitting the SR, and the resources for transmitting the SR include at least one type of time resources, frequency resources and code resources for transmitting the SR. A mode of indicating the volume of a part of the whole uplink data to be transmitted by the resources for transmitting the SR is similar to the mode of indicating the scheduling information for the BSR by the resources for transmitting the SR as described above with reference to FIG. 4 and FIG. 5, and no details will be repeated here.

Returning to FIG. 8, in step S820, an uplink grant indicating scheduling information for transmitting the part of uplink data is received from the base station. The step may correspond to step S220 described above with reference to FIG. 2.

Specifically, after receiving the SR, the base station may determine the volume of a part of the uplink data to be transmitted by the UE to the base station. Then, the base station may allocate to the UE uplink scheduling information, so that the UE may transmit the part of uplink data by employing the scheduling information. The base station may notify the user equipment of the allocated scheduling information by transmitting the UL grant to the UE.

In step S830, the UE transmits to the base station the part of uplink data by employing the scheduling information. In this case, the UE may indicate the volume of remaining uplink data to be transmitted by the UE to the base station in the transmitted part of uplink data. Similar to step S750 in FIG. 7, the volume of the remaining uplink data to be transmitted by the UE to the base station may be explicitly or implicitly indicated in the part of uplink data, and no details will be repeated here.

When the base station receives the part of uplink data indicating the volume of the remaining uplink data, the base station obtains the volume of the remaining uplink data by demodulating/decoding the part of uplink data, allocates scheduling information for transmitting the remaining uplink data, and transmits to the user equipment an uplink grant indicating the scheduling information for transmitting the remaining uplink data.

Returning to FIG. 8, in step S840, the UE receives, from the base station, an uplink grant indicating the scheduling information for transmitting the remaining uplink data, and in step S850, the UE transmits to the base station the remaining uplink data by employing the scheduling information.

In the fourth implementation mode, the base station may determine the volume of the whole uplink data, by combining the volume of a part of the whole uplink data indicated in the SR and the volume of the remaining uplink data carried in the transmitted part of uplink data. For example, Table 9 below shows an example that the base station determines the volume of the whole uplink data, in a case where the volume of a part of the whole uplink data is indicated by employing 2 bits in the SR and the volume of the remaining uplink data is indicated by employing the code resources (the sequences) for transmitting the part of uplink data.

TABLE 9

| Sequence number & Bit information | DV (byte) |
|---|---|
| S0&0 | DV = 0 |
| S1&0 | 0 < DV ≤ 10 |
| S2&0 | 10 < DV ≤ 14 |
| S3&0 | 14 < DV ≤ 19 |
| S0&1 | 19 < DV ≤ 26 |
| S1&1 | 26 < DV ≤ 36 |
| S2&1 | 36 < DV ≤ 49 |
| S3&1 | 49 < DV ≤ 67 |
| S0&2 | 67 < DV ≤ 91 |
| S1&2 | 91 < DV ≤ 125 |
| S2&2 | 125 < DV ≤ 171 |
| S3&2 | 171 < DV ≤ 234 |
| S0&3 | 234 < DV ≤ 321 |
| S1&3 | 321 < DV ≤ 768 |
| S2&3 | 768 < DV ≤ 1500 |
| S3&3 | DV ≥ 1500 |

In the schematic flow chart shown in FIG. 8, step S810 may correspond to step S210 in FIG. 2, step S820 may correspond to step S220 in FIG. 2, and step S830 to step S850 may correspond to step S230 in FIG. 2.

In the fourth implementation mode, as described above, the UE notifies the base station of the volume of a part of the whole uplink data to be transmitted by the SR, so that the base station is no longer required to determine the scheduling information for the BSR and transmit the scheduling information to the UE by the UL grant and the UE is not required to transmit the BSR. Thus, step S1702 and step S1703 shown in FIG. 17 may be omitted, thereby simplifying the flow.

Hereinafter, the user equipment (UE) according to the first embodiment of the present disclosure will be described. The UE may perform the above-described methods. Here, for convenience of description, description of details that is the same as those of the above-described methods is omitted.

Figure 9:
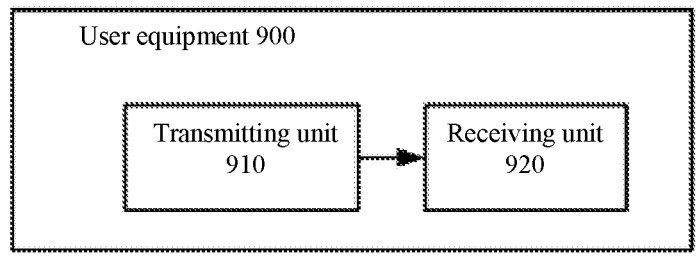
FIG. 9 shows a structural schematic diagram of a user equipment according to the first embodiment of the present disclosure.

FIG. 9 shows a structural schematic diagram of a user equipment 900 according to the first embodiment of the present disclosure.

As shown in FIG. 9, the UE 900 comprises a transmitting unit 910 and a receiving unit 920. It should be noted that, FIG. 9 only shows the units in the UE 900 that are closely related to the embodiments of the present disclosure. However, it is merely illustrative. The UE 900 may comprise other units if needed.

The transmitting unit 910 may transmit to a base station a schedule request (SR).

The receiving unit 920 may receive, from the base station, an uplink grant indicating scheduling information for transmitting uplink data, where, the scheduling information is allocated by the base station according to the volume of the uplink data, the volume being determined by the SR.

Then, the transmitting unit 910 may further transmit to the base station the uplink data by employing the scheduling information.

As described above, according to the first implementation mode of the first embodiment of the present disclosure, the SR indicates scheduling information for a buffer status report (BSR), and the BSR indicates the volume of the uplink data (the whole uplink data to be transmitted by the UE to the base station).

In one example, the scheduling information for the BSR may be explicitly indicated by the SR. Specifically, information bits for indicating the scheduling information for the BSR may be padded or set in the SR. The scheduling information for the BSR may be indicated with reference to Table 1 and Table 2 above. The scheduling information for the BSR may also be indicated by employing a mapping relationship with reference to Table 3 above.

In another example, the scheduling information for the BSR may be implicitly indicated by the SR. For example, the scheduling information for the BSR may be implicitly indicated by resources for transmitting the SR, where, the resources for transmitting the SR may include at least one types of time resources, frequency resources and code resources for transmitting the SR. The case of indicating the scheduling information for the BSR by the resources for transmitting the SR has been specifically described with reference to FIG. 4 and FIG. 5, and no details will be repeated here.

Before receiving the uplink grant indicating the scheduling information for transmitting the uplink data from the base station, the transmitting unit 910 further transmits the BSR according to the scheduling information for the BSR indicated by the SR. The base station may receive the BSR transmitted by the UE according to the scheduling information, determine the volume of the uplink data to be transmitted by the UE to the base station according to the BSR, allocate scheduling information for transmitting the uplink data, and transmit the scheduling information to the UE by the UL grant.

Moreover, as described above, according to the second implementation mode of the first embodiment of the present disclosure, the SR indicates the volume of the uplink data (the whole uplink data to be transmitted by the UE to the base station). In one example, the volume of the uplink data may be explicitly indicated by the SR. Specifically, information bits for indicating the volume of the uplink data may be padded or set in the SR. For example, the information bits may be employed to directly indicate the volume of the uplink data, and the information bits may also be employed to indicate an index corresponding to each volume with reference to Table 5 above.

In another example, the SR may implicitly indicate the volume of the uplink data. Specifically, the volume of the uplink data may be indicated by resources for transmitting the SR, and the resources for transmitting the SR include at least one type of time resources, frequency resources and code resources for transmitting the SR. A case of indicating the volume of the uplink data by the resources for transmitting the SR is similar to the case of indicating the scheduling information for the BSR by the resources for transmitting the SR as described above with reference to FIG. 4 and FIG. 5, and no details will be repeated here.

After receiving the SR, the base station may determine the volume of the uplink data to be transmitted by the UE to the base station according to the SR, allocate the scheduling information for transmitting the uplink data, and transmit the scheduling information to the UE by the UL grant.

In addition, as described above, according to the third implementation mode of the first embodiment of the present disclosure, the SR indicates whether the volume of the whole uplink data to be transmitted by the user equipment is greater than a threshold. The threshold may be predetermined between the UE and the base station. The SR may explicitly or implicitly indicate whether the volume of the whole uplink data to be transmitted by the user equipment is greater than the threshold.

In one example, information bits may be employed to explicitly indicate whether the volume of the whole uplink data to be transmitted is greater than the threshold. Specifically, the information bits for indicating whether the volume of the whole uplink data to be transmitted is greater than the threshold may be padded in the SR. For example, 1 bit may be employed to indicate whether the volume of the whole uplink data to be transmitted is greater than the threshold. Specifically, when the bit is "0", it indicates that the volume of the whole uplink data to be transmitted is not greater than the threshold; and when the bit is "1", it indicates that the volume of the whole uplink data to be transmitted is greater than the threshold.

In another example, information bits may be employed to implicitly indicate whether the volume of the whole uplink data to be transmitted is greater than the threshold. Specifically, resources for transmitting the SR may be employed to indicate whether the volume of the whole uplink data to be transmitted is greater than the threshold, and the resources for transmitting the SR include at least one type of time resources, frequency resources and code resources for transmitting the SR. A case of indicating whether the volume of the whole uplink data to be transmitted is greater than the threshold by the resources for transmitting the SR is similar to the case of indicating the scheduling information for the BSR by the resources for transmitting the SR as described above with reference to FIG. 4 and FIG. 5, and no details will be repeated here.

When the volume of the whole uplink data to be transmitted by the user equipment is not greater than the threshold, the base station allocates the scheduling information for transmitting uplink data with a volume equal to the threshold. That is, the scheduling information for transmitting the uplink data is allocated by the base station according to the threshold. Then, the base station may transmit the scheduling information to the UE by the UL grant. At this time, the transmitting unit 910 may transmit to the base station the whole uplink data by employing the scheduling information.

When the volume of the whole uplink data to be transmitted by the user equipment is greater than the threshold, the base station may allocate scheduling information for transmitting uplink data with a volume equal to the threshold. Then, the base station may transmit the scheduling information to the UE by the UL grant. The receiving unit 920 receives the UL grant, and the transmitting unit 910 may firstly transmit to the base station the uplink data with a volume equal to the threshold by employing the scheduling information. In this case, the transmitting unit 910 may further indicate the volume of remaining uplink data to be transmitted by the UE to the base station by the uplink data. The volume of the remaining uplink data to be transmitted by the UE to the base station may be explicitly or implicitly indicated by the uplink data. For example, the volume of the remaining uplink data may be explicitly indicated by employing information bits in the uplink data or implicitly indicated by employing a sequence for scrambling the uplink data. A specific mode of indicating the volume of the remaining uplink data to be transmitted to the base station by the uplink data has been described above, and no details will be repeated here. It should be noted that, although it is described here that the base station allocates scheduling information for the uplink data with a volume equal to the threshold, it is merely illustrative. The base station may also allocate scheduling information for uplink data with other volume (e.g., less than the threshold).

After receiving a part of uplink data transmitted by the UE (for example, the uplink data with a volume equal to the threshold), the base station obtains information on the volume of remaining uplink data by processing (for example, demodulating/decoding) the part of uplink data received, allocates scheduling information for transmitting the remaining uplink data, and transmits to the user equipment an uplink grant indicating the scheduling information for transmitting the remaining uplink data. The receiving unit 920 may receive the uplink grant from the base station, and the transmitting unit 910 transmits to the base station the remaining uplink data by employing the scheduling information for transmitting the remaining uplink data.

As described above, according to the fourth implementation mode of the first embodiment of the present disclosure, the SR indicates the volume of a part of the whole uplink data. The SR may explicitly or implicitly indicate the volume of a part of the whole uplink data to be transmitted by the user equipment. As described above, the volume of a part of the whole uplink data to be transmitted may be indicated by information bits (for example, 2 bits) in the SR or by resources for transmitting the SR, and the resources for transmitting the SR include at least one type of time resources, frequency resources and code resources for transmitting the SR. A mode of indicating the volume of a part of the whole uplink data to be transmitted by the resources for transmitting the SR is similar to the mode of indicating the scheduling information for the BSR by the resources for transmitting the SR as described above with reference to FIG. 4 and FIG. 5, and no details will be repeated here.

After receiving the SR, the base station may determine the volume of the part of uplink data indicated thereby, allocate scheduling information for the part of data, and transmit the scheduling information to the UE by the UL grant, so that the transmitting unit 910 may transmit to the base station the part of uplink data by employing the scheduling information. In addition, the transmitting unit 910 may further indicate the volume of remaining uplink data to be transmitted by the UE to the base station by the uplink data. The volume of the remaining uplink data may be explicitly or implicitly indicated in the uplink data. A specific indication method has been described above, and no details will be repeated here.

After receiving the part of uplink data transmitted by the UE, the base station may determine the volume of the remaining uplink data, allocate the scheduling information for transmitting the remaining uplink data, and transmit the scheduling information to the UE by the UL grant. The receiving unit 920 receives the UL grant from the base station, and the transmitting unit 910 transmits to the base station the remaining uplink data by employing the scheduling information.

Hereinafter, a method of receiving uplink data by a base station according to the first embodiment of the present disclosure will be described.

Figure 10:
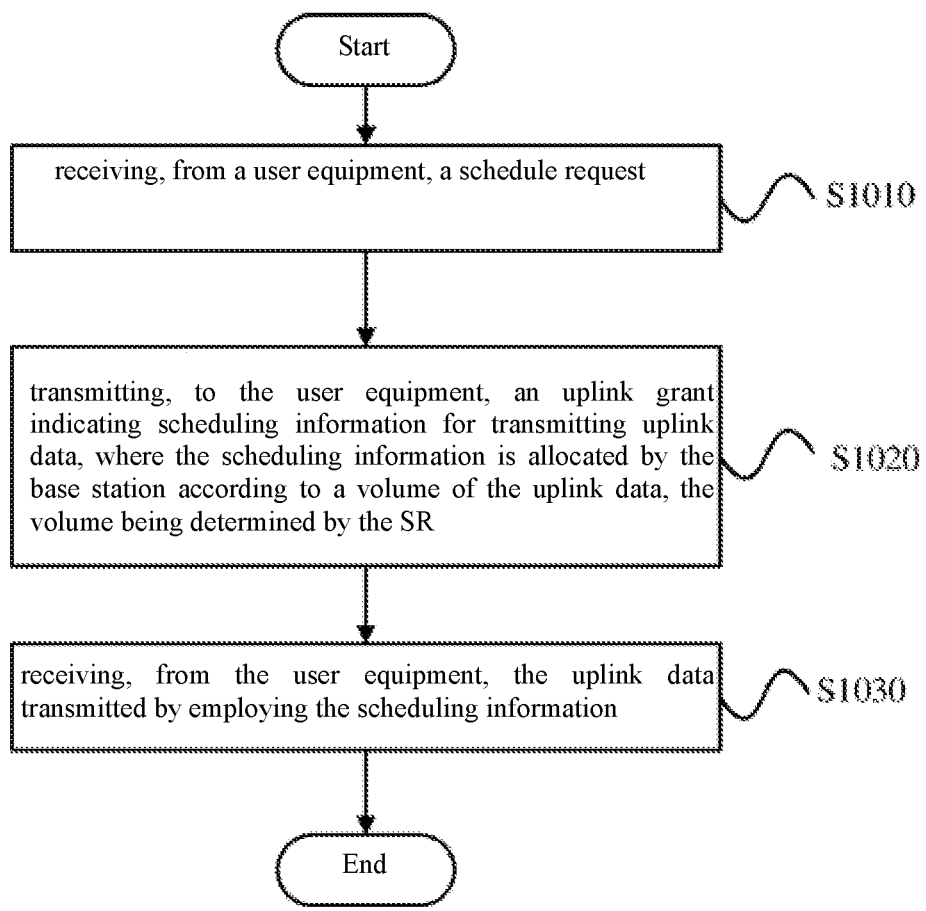
FIG. 10 shows a schematic flow chart of a method for receiving uplink data by a base station according to the first embodiment of the present disclosure.

FIG. 10 shows a schematic flow chart of a method 1000 for receiving uplink data by a base station according to the first embodiment of the present disclosure. The method may be performed by the base station.

As shown in FIG. 10, in step S1010, the base station receives, from a user equipment, a schedule request (SR). In step S1020, the base station transmits, to the user equipment, an uplink grant indicating scheduling information for transmitting uplink data, where the scheduling information is allocated by the base station according to the volume of the uplink data, the volume being determined according to the SR. In step S1030, the base station receives, from the user equipment, the uplink data transmitted by employing the scheduling information.

According to the first implementation mode of the first embodiment of the present disclosure, the SR received by the base station from the user equipment indicates scheduling information for a BSR. As described above, the SR may explicitly or implicitly indicate the scheduling information for the BSR. Accordingly, the base station may determine the scheduling information for the BSR according to the SR in a corresponding mode. Therefore, before transmitting the uplink grant indicating the scheduling information for transmitting the uplink data, the base station may receive, from the user equipment, the BSR according to the scheduling information for the BSR indicated by the SR, to obtain the volume of uplink data to be transmitted by the user equipment, may allocate scheduling information for transmitting the uplink data, and may transmit to the UE the UL grant indicating the scheduling information.

According to the second implementation mode of the first embodiment of the present disclosure, the SR received by the base station from the user equipment indicates the volume of uplink data to be transmitted by the UE. As described above, the SR may explicitly or implicitly indicate the volume of the uplink data to be transmitted by the UE. Accordingly, the base station may determine the volume of the uplink data to be transmitted by the UE according to the SR in a corresponding mode. Then, the base station allocates the scheduling information for transmitting the uplink data, and transmits to the UE the UL grant indicating the scheduling information.

According to the third implementation mode of the first embodiment of the present disclosure, the SR received by the base station from the user equipment indicates whether the volume of the whole uplink data to be transmitted by the user equipment is greater than a threshold. As described above, the SR may explicitly or implicitly indicate whether the volume of the whole uplink data to be transmitted by the user equipment is greater than the threshold. Accordingly, the base station may determine whether the volume of the whole uplink data to be transmitted by the user equipment is greater than the threshold by the SR in a corresponding mode. When the SR received from the user equipment indicates that the volume of the whole uplink data to be transmitted by the user equipment is not greater than the threshold, the base station allocates the scheduling information for transmitting the uplink data according to the threshold. That is, the base station allocates scheduling information for transmitting uplink data with a volume equal to the threshold, and transmits to the user equipment an uplink grant indicating the scheduling information.

In addition, when the SR received from the user equipment indicates that the volume of the whole uplink data to be transmitted by the user equipment is greater than the threshold, the base station allocates the scheduling information for transmitting the uplink data according to the threshold. That is, the base station allocates the scheduling information for transmitting the uplink data with a volume equal to the threshold, and transmits to the UE an uplink grant indicating the scheduling information, so that the UE transmits the uplink data with a volume equal to the threshold by employing the scheduling information. In addition, as described above, the volume of remaining uplink data to be transmitted by the UE to the base station is also explicitly or implicitly indicated in the uplink data Thus, the base station may determine the volume of the remaining uplink data in a corresponding mode, allocate scheduling information for transmitting the remaining uplink data, and transmit to the UE an uplink grant indicating the scheduling information, so that the UE transmits to the base station the remaining uplink data by employing the scheduling information. Then, the base station may receive the remaining uplink data transmitted by the UE by employing the scheduling information.

According to the fourth implementation mode of the first embodiment of the present disclosure, the SR received by the base station from the user equipment indicates the volume of a part of the whole uplink data to be transmitted by the user equipment. As described above, the SR may explicitly or implicitly indicate the volume of a part of the whole uplink data to be transmitted by the user equipment. Accordingly, the base station may determine the volume of a part of the whole uplink data to be transmitted by the user equipment according to the SR in a corresponding mode. Then, the base station may allocate scheduling information for transmitting the part of uplink data, and transmit to the user equipment an uplink grant indicating the scheduling information, so that the UE transmits the uplink data with a volume equal to the threshold by employing the scheduling information. In addition, as described above, the volume of remaining uplink data to be transmitted by the UE to the base station is also explicitly or implicitly indicated in the uplink data. Thus, the base station may determine the volume of the remaining uplink data in a corresponding mode, allocate scheduling information for transmitting the remaining uplink data, and transmit to the UE an uplink grant indicating the scheduling information, so that the UE transmits to the base station the remaining uplink data by employing the scheduling information. Then, the base station may receive the remaining uplink data transmitted by the UE by employing the scheduling information.

Hereinafter, a base station according to the first embodiment of the present disclosure will be described.

Figure 11:
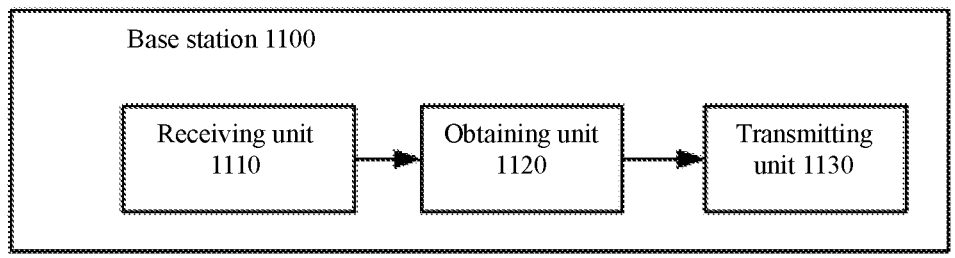
FIG. 11 shows a structural schematic diagram of a base station according to the first embodiment of the present disclosure.

FIG. 11 shows a structural schematic diagram of a base station 1100 according to the first embodiment of the present disclosure.

As shown in FIG. 11, the base station 1100 comprises a receiving unit 1110, an obtaining unit 1120 and a transmitting unit 1130. It should be noted that, FIG. 11 only shows the units in the base station 1100 that are closely related to the embodiment of the present disclosure. However, it is merely illustrative. The base station 1100 may comprise other units if needed.

As shown in FIG. 11, in step S1010, the receiving unit 1110 receives, from a user equipment, a schedule request (SR). The transmitting unit 1130 transmits to the user equipment an uplink grant indicating scheduling information for transmitting uplink data, where the scheduling information is allocated by the base station according to the volume of the uplink data, the volume being determined according to the SR. The receiving unit 1110 receives, from the user equipment, the uplink data transmitted by employing the scheduling information. The obtaining unit 1120 determines the volume of the uplink data by the SR.

According to the first implementation mode of the first embodiment of the present disclosure, the SR received by the receiving unit 1110 from the user equipment indicates scheduling information for a BSR. As described above, the SR may explicitly or implicitly indicate the scheduling information for the BSR. Accordingly, the obtaining unit 1120 may determine the scheduling information for the BSR according to the SR in a corresponding mode. Therefore, before transmitting the uplink grant indicating the scheduling information for transmitting the uplink data, the base station may receive, by the obtaining unit 1120, the BSR from the user equipment according to the scheduling information for the BSR indicated by the SR to obtain the volume of uplink data to be transmitted by the user equipment, may allocate scheduling information for transmitting the uplink data, and may transmit, by the transmitting unit 1130, a UL grant indicating the scheduling information to the UE.

According to the second implementation mode of the first embodiment of the present disclosure, the SR received by the receiving unit 1110 from the user equipment indicates the volume of uplink data to be transmitted by the UE. As described above, the SR may explicitly or implicitly indicate the volume of the uplink data to be transmitted by the UE. Accordingly, the obtaining unit 1120 may determine the volume of the uplink data to be transmitted by the UE according to the SR in a corresponding mode. Then, the base station allocates scheduling information for transmitting the uplink data, and the transmitting unit 1130 transmits to the UE the UL grant indicating the scheduling information.

According to the third implementation mode of the first embodiment of the present disclosure, the SR received by the receiving unit 1110 from the user equipment indicates whether the volume of the whole uplink data to be transmitted by the user equipment is greater than a threshold. As described above, the SR may explicitly or implicitly indicate whether the volume of the whole uplink data to be transmitted by the user equipment is greater than the threshold. Accordingly, the obtaining unit 1120 may determine whether the volume of the whole uplink data to be transmitted by the user equipment is greater than the threshold by the SR in a corresponding mode. When the SR received from the user equipment indicates that the volume of the whole uplink data to be transmitted by the user equipment is not greater than the threshold, the base station allocates scheduling information for transmitting the uplink data according to the threshold. That is, the base station allocates scheduling information for transmitting uplink data with a volume equal to the threshold, and the transmitting unit 1130 transmits to the user equipment an uplink grant indicating the scheduling information.

In addition, when the SR received from the user equipment indicates that the volume of the whole uplink data to be transmitted by the user equipment is greater than the threshold, the base station allocates the scheduling information for transmitting the uplink data according to the threshold. That is, the base station allocates the scheduling information for transmitting the uplink data with a volume equal to the threshold, and the transmitting unit 1130 transmits to the UE an uplink grant indicating the scheduling information, so that the UE transmits the uplink data with a volume equal to the threshold by employing the scheduling information. In addition, as described above, the volume of remaining uplink data to be transmitted by the UE to the base station is also explicitly or implicitly indicated in the uplink data. Thus, the obtaining unit 1120 may determine the volume of the remaining uplink data in a corresponding mode and allocate scheduling information for transmitting the remaining uplink data, and the transmitting unit 1130 transmits to the UE an uplink grant indicating the scheduling information, so that the UE transmits the remaining uplink data to the base station by employing the scheduling information. Then, the receiving unit 1110 may receive the remaining uplink data transmitted by the UE by employing the scheduling information.

According to the fourth implementation mode of the first embodiment of the present disclosure, the SR received by the receiving unit 1110 from the user equipment indicates the volume of a part of the whole uplink data to be transmitted by the user equipment. As described above, the SR may explicitly or implicitly indicate the volume of a part of the whole uplink data to be transmitted by the user equipment. Accordingly, the obtaining unit 1120 may determine the volume of a part of the whole uplink data to be transmitted by the user equipment according to the SR in a corresponding mode. Then, the base station may allocate scheduling information for transmitting the part of uplink data, and the transmitting unit 1130 transmits to the user equipment an uplink grant indicating the scheduling information, so that the UE transmits the uplink data with a volume equal to the threshold by employing the scheduling information. In addition, as described above, the volume of the remaining uplink data to be transmitted by the UE to the base station is also explicitly or implicitly indicated in the uplink data. Thus, the obtaining unit 1120 may determine the volume of the remaining uplink data in a corresponding mode, and allocate scheduling information for transmitting the remaining uplink data, and the transmitting unit 1130 transmits to the UE an uplink grant indicating the scheduling information, so that the UE transmits to the base station the remaining uplink data by employing the scheduling information. Then, the receiving unit 1110 may receive the remaining uplink data transmitted by the UE by employing the scheduling information.

In the above-described first embodiment, the SR is employed to indicate the scheduling information for the BSR, the volume of the uplink data to be transmitted, whether the volume of the uplink data is greater than the threshold, or the volume of a part of the whole uplink data to be transmitted, so as to notify the base station of the volume of the uplink data to be transmitted.

In a second embodiment of the present disclosure, a base station may not be notified of the volume of uplink data to be transmitted. In one implementation mode, a UE may notify the base station that the UE is to start transmitting uplink data by transmitting to the base station a SR, and then may transmit the uplink data by employing predefined scheduling information. In another implementation mode, the UE may request the base station to schedule scheduling information for transmitting uplink data by transmitting to the base station a SR, and then transmit the uplink data by employing the scheduling information scheduled by the base station.

Hereinafter, a method for transmitting uplink data by a user equipment according to the second embodiment of the present disclosure will be described.

Figure 12:
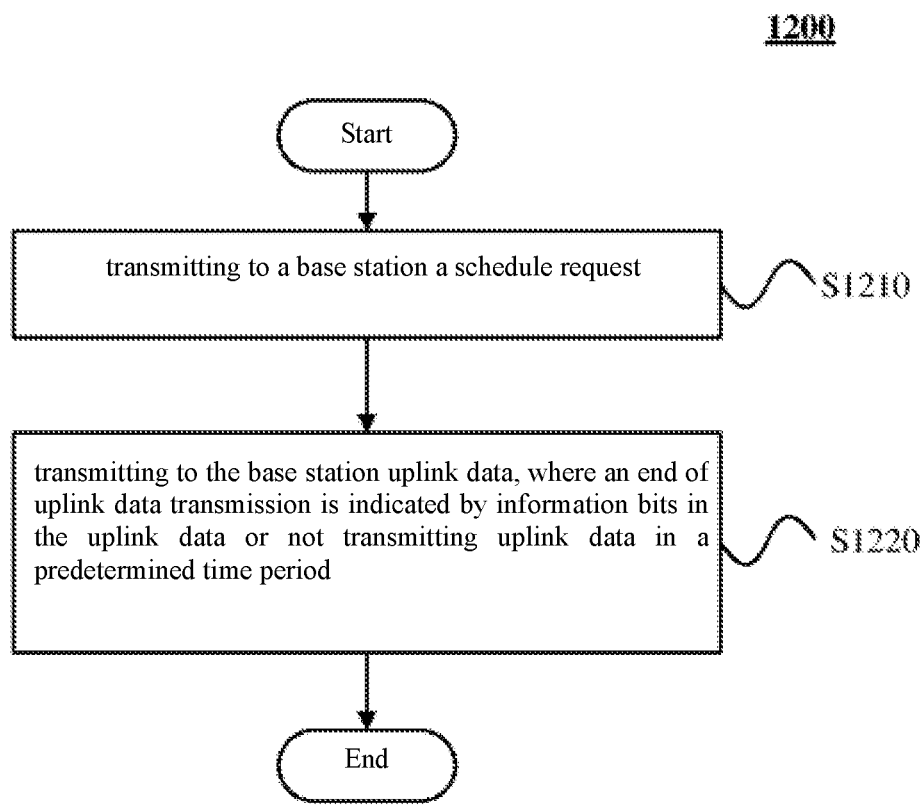
FIG. 12 is a schematic flow chart showing a method for transmitting uplink data by a user equipment according to a second embodiment of the present disclosure.

FIG. 12 is a schematic flow chart showing a method 1200 for transmitting uplink data by a user equipment according to the second embodiment of the present disclosure.

As shown in FIG. 12, in step S1210, the UE transmits to a base station a schedule request SR.

In S1220, the UE transmits to the base station uplink data, where an end of uplink data transmission is indicated by information bits in the uplink data or not transmitting uplink data in a predetermined time period.

In a first implementation mode, the SR transmitted by the UE may indicate that there is uplink data to be transmitted to the base station in the UE, so that when receiving the SR, the base station may acquire that there is uplink data to be transmitted to the base station in the UE. Subsequently, the UE may transmit to the base station the uplink data by employing predefined scheduling information. The predefined scheduling information is known to both the base station and the UE, and may include, for example, resources, a MCS and/or the number of repetitions, and so on. Since the base station knows the predefined scheduling information, the base station may receive the uplink data by employing the scheduling information. In addition, the base station does not schedule data of other UEs in the scheduling information, so as to avoid collisions between different UEs.

When the predefined scheduling information is insufficient to transmit the whole uplink data to be transmitted by the UE to the base station, the UE may repeat step S1220 until the whole uplink data is transmitted to the base station.

However, since the base station does not know the volume of uplink data to be transmitted by the UE, the base station cannot determine whether the UE will continue uplink data transmission thereto, that is, it cannot determine whether uplink data transmission of the UE ends. In this case, when transmitting uplink data for the last time, the UE may indicate to the base station that the uplink data is the last uplink data. For example, the UE may add an end tag (for example, 1 bit) in the last transmitted uplink data to indicate that the data is the last uplink data, that is, indicate the end of uplink data transmission. Alternatively, when the whole uplink data has been transmitted to the base station, the UE may no longer transmit uplink data to the base station, so that when the base station finds that it does not receive uplink data within a predetermined time period, it determines that uplink data transmission of the UE ends.

Figure 17:
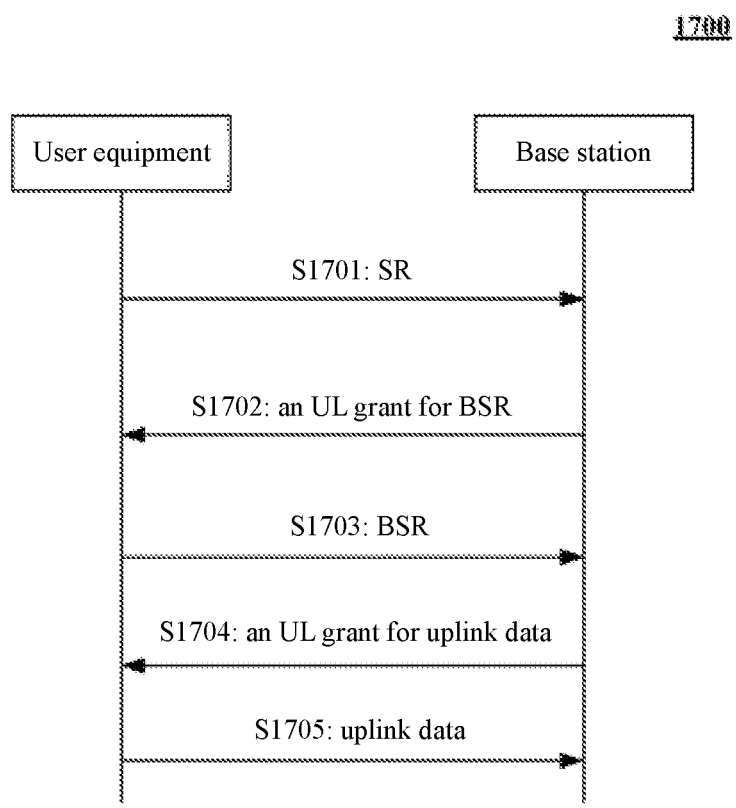
FIG. 17 is a schematic data flow diagram showing a UE transmitting data to a base station in an LTE system.

In the first implementation mode, step S1702 to step S1704 shown in FIG. 17 may be omitted, thereby simplifying the flow.

In a second implementation mode, after receiving the SR, the base station may allocate to the UE scheduling information for transmitting uplink data, and transmit to the UE an UL grant indicating the scheduling information, so that the UE may transmit to the base station the uplink data by employing the scheduling information allocated by the base station.

Similarly, since the base station does not know the volume of uplink data to be transmitted by the UE, the base station cannot determine whether the UE will continue uplink data transmission thereto, that is, it cannot determine whether uplink data transmission of the UE ends. In this case, after receiving the uplink data transmitted by the UE, the base station may repeat a process of allocating to the UE scheduling information for transmitting uplink data and transmitting to the UE an UL grant indicating the resources, so that the UE can transmit to the base station the remaining uplink data by employing the scheduling information allocated by the base station. On the other hand, when transmitting uplink data for the last time, the UE may indicate to the base station that the uplink data is the last uplink data. For example, the UE may add an end tag (for example, 1 bit) in the last transmitted uplink data to indicate that the data is the last uplink data, that is, indicate the end of uplink data transmission. Alternatively, when the whole uplink data has been transmitted to the base station, the UE may no longer respond to the UL grant transmitted by the base station, that is, no longer transmit uplink data to the base station, so that when the base station finds that it does not receive uplink data within a predetermined time period, it determines that uplink data transmission of the UE ends.

In the second implementation mode, step S1702 to step S1703 shown in FIG. 17 may be omitted, thereby simplifying the flow.

Hereinafter, a user equipment according to the second embodiment of the present disclosure will be described.

Figure 13:
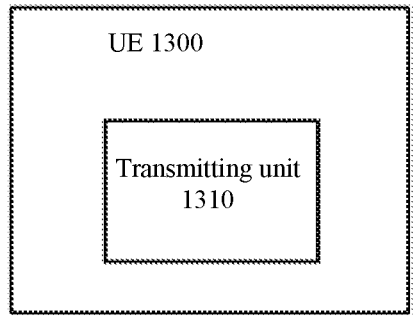
FIG. 13 shows a structural schematic diagram of a user equipment according to the second embodiment of the present disclosure.

FIG. 13 shows a structural schematic diagram of a user equipment 1300 according to the second embodiment of the present disclosure.

As shown in FIG. 13, the UE 1300 comprises a transmitting unit 1310. It should be noted that, FIG. 13 only shows the units in the UE 1300 that are closely related to the embodiment of the present disclosure. However, it is merely illustrative. The UE 1300 may comprise other units if needed.

The transmitting unit 1310 transmits to a base station a schedule request SR. In addition, the transmitting unit 1310 further transmits to the base station uplink data, where an end of uplink data transmission is indicated by information bits in the uplink data or not transmitting uplink data in a predetermined time period.

In a first implementation mode, the SR transmitted by the transmitting unit 1310 may indicate that there is uplink data to be transmitted to the base station in the UE, so that when receiving the SR, the base station may acquire that there is uplink data to be transmitted to the base station in the UE. Subsequently, the transmitting unit 1310 may transmit to the base station the uplink data by employing predefined scheduling information. The predefined scheduling information is known to both the base station and the UE, and may include, for example, resources, a MCS and/or the number of repetitions, and so on. Since the base station knows the predefined scheduling information, the base station may receive the uplink data by employing the scheduling information.

When the predefined scheduling information is insufficient to transmit the whole uplink data to be transmitted by the UE to the base station, the transmitting unit 1310 may repeat the above-described transmitting operation, until the whole uplink data is transmitted to the base station. However, since the base station does not know the volume of uplink data to be transmitted by the UE, the base station cannot determine whether the UE will continue uplink data transmission thereto, that is, it cannot determine whether uplink data transmission of the UE ends. In this case, when transmitting uplink data for the last time, the UE may indicate to the base station that the uplink data is the last uplink data. For example, the transmitting unit 1310 may add an end tag (for example, 1 bit) in the last transmitted uplink data to indicate that the data is the last uplink data, that is, indicate the end of uplink data transmission. Alternatively, when the whole uplink data has been transmitted to the base station, the transmitting unit 1310 may no longer transmit uplink data to the base station, so that when the base station finds that it does not receive uplink data within a predetermined time period, it determines that uplink data transmission of the UE ends.

In a second implementation mode, after receiving the SR, the base station may allocate to the UE scheduling information for transmitting uplink data, and transmit to the UE a UL grant indicating the scheduling information, so that a receiving unit (not shown) of the UE may receive the UL grant, and then the transmitting unit 1310 may transmit to the base station the uplink data by employing the scheduling information allocated by the base station.

Similarly, since the base station does not know the volume of uplink data to be transmitted by the UE, the base station cannot determine whether the UE will continue uplink data transmission thereto, that is, it cannot determine whether uplink data transmission of the UE ends. In this case, after receiving the uplink data transmitted by the UE, the base station may repeat a process of allocating to the UE scheduling information for transmitting uplink data and transmitting to the UE a UL grant indicating the resource, so that the transmitting unit 1310 of the UE can transmit to the base station the remaining uplink data by employing the scheduling information allocated by the base station. On the other hand, when transmitting uplink data for the last time, the UE may indicate to the base station that the uplink data is the last uplink data. For example, the transmitting unit 1310 may add an end tag (for example, 1 bit) in the last transmitted uplink data to indicate that the data is the last uplink data, that is, indicate the end of uplink data transmission. Alternatively, when the whole uplink data has been transmitted to the base station, the UE may no longer respond to the UL grant transmitted by the base station, that is, the transmitting unit 1310 no longer transmits uplink data to the base station, so that when the base station finds that it does not receive uplink data within a predetermined time period, it determines that uplink data transmission of the UE ends.

Hereinafter, a method of receiving uplink data by a base station according to the second embodiment of the present disclosure will be described.

Figure 14:
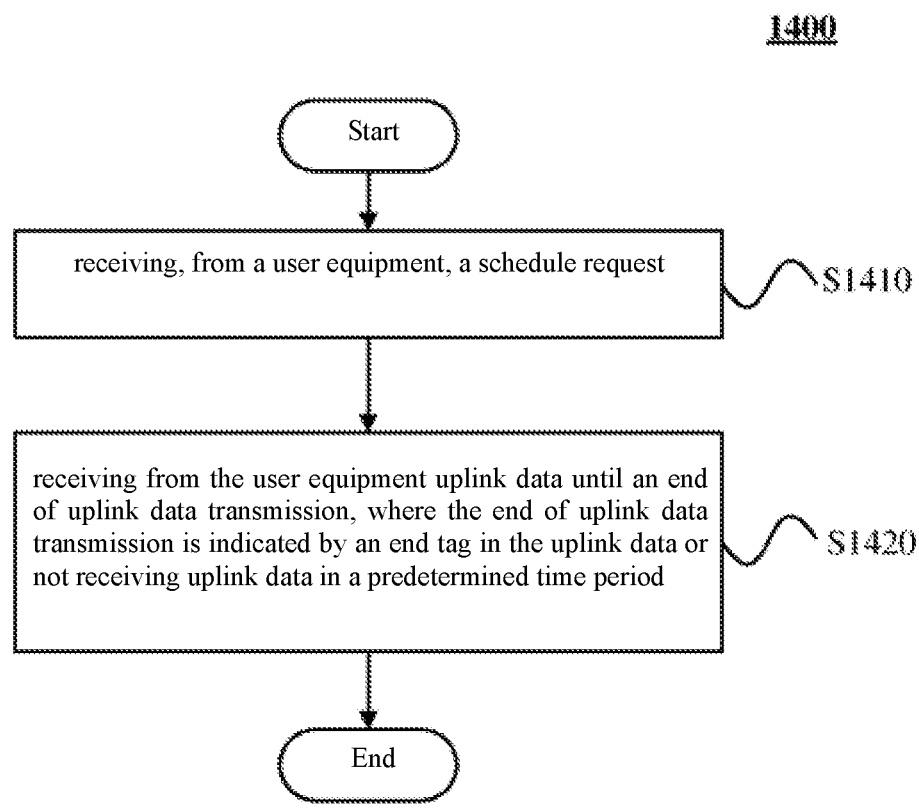
FIG. 14 is a schematic flow chart showing a method for receiving uplink data by a base station according to the second embodiment of the present disclosure.

FIG. 14 is a schematic flow chart showing a method 1400 for receiving uplink data by a base station according to the second embodiment of the present disclosure.

As shown in FIG. 14, in S1410, the base station receives a schedule request from a user equipment, and in S1420, receives uplink data from the user equipment until an end of uplink data transmission, where the end of uplink data transmission is indicated by an end tag in the uplink data or not receiving uplink data in a predetermined time period.

As described above, in a first implementation mode, the SR transmitted by the UE may indicate that there is uplink data to be transmitted to the base station in the UE, so that when receiving the SR, the base station may acquire that there is uplink data to be transmitted to the base station in the UE. Subsequently, the base station may receive the uplink data from the UE by employing predefined scheduling information.

When the predefined scheduling information is insufficient to transmit the whole uplink data to be transmitted by the UE to the base station, the base station may repeat step S1420 until the whole uplink data is received. As described above, in the uplink data transmitted for the last time, the UE may explicitly or implicitly indicate whether uplink data transmission ends. Accordingly, the base station may determine whether uplink data transmission of the UE ends. For example, the base station may acquire that the data is the last uplink data by an end tag (for example, 1 bit) in the uplink data received from the UE, so as to determine that uplink data transmission ends. Alternatively, when the base station finds that it does not receive uplink data within a predetermined time period, it determines that uplink data transmission of the UE ends.

In a second implementation mode, after receiving the SR, the base station allocates to the UE scheduling information for transmitting uplink data, and transmits to the UE an UL grant indicating the scheduling information, so that the UE may transmit to the base station the uplink data by employing the scheduling information allocated by the base station.

Similarly, the base station may repeat a process of allocating to the UE scheduling information for transmitting uplink data, and transmitting to the UE an UL grant indicating the scheduling information. Thus, the base station may continuously receive the uplink data transmitted by the UE. As described above, in the uplink data transmitted for the last time, the UE may explicitly or implicitly indicate whether uplink data transmission ends. Accordingly, the base station may determine whether uplink data transmission of the UE ends. For example, the base station may acquire that the data is the last uplink data by an end tag (for example, 1 bit) in the uplink data received from the UE, so as to determine that uplink data transmission ends. Alternatively, when the base station finds that it does not receive uplink data within a predetermined time period, it determines that uplink data transmission of the UE ends.

Hereinafter, a base station according to the second embodiment of the present disclosure will be described.

Figure 15:
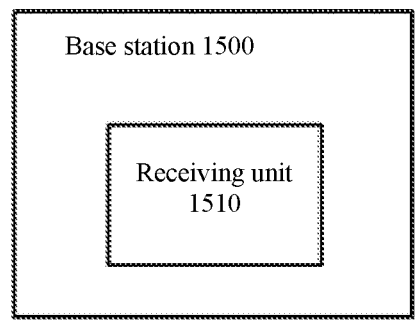
FIG. 15 shows a structural schematic diagram of a base station according to the second embodiment of the present disclosure.

FIG. 15 shows a structural schematic diagram of a base station 1500 according to the second embodiment of the present disclosure.

As shown in FIG. 15, the base station 1500 comprises a receiving unit 1510. It should be noted that FIG. 15 only shows the units in the base station 1500 that are closely related to the embodiment of the present disclosure. However, it is merely illustrative. The base station 1500 may comprise other units if needed.

As shown in FIG. 15, the receiving unit 1510 may receive a schedule request from a user equipment, and may receive uplink data from the user equipment until an end of uplink data transmission, where the end of uplink data transmission is indicated by an end tag in the uplink data or not receiving uplink data in a predetermined time period.

As described above, in the first implementation mode, the SR transmitted by the UE may indicate that there is uplink data to be transmitted to the base station in the UE, so that when receiving the SR, the base station 1500 may acquire that there is uplink data to be transmitted to the base station 1500 in the UE. Subsequently, the receiving unit 1510 may receive the uplink data from the UE by employing predefined scheduling information.

When the predefined scheduling information is insufficient to transmit the whole uplink data to be transmitted by the UE to the base station 1500, the receiving unit 1510 may repeatedly receive uplink data from the user equipment, until the whole uplink data is received. As described above, in the uplink data transmitted for the last time, the UE may explicitly or implicitly indicate whether uplink data transmission ends. Accordingly, the base station 1500 may determine whether uplink data transmission of the UE ends. For example, the base station 1500 may acquire that the data is the last uplink data by an end tag (for example, 1 bit) in the uplink data received from the UE, so as to determine that uplink data transmission ends. Alternatively, when the base station 1500 finds that it does not receive uplink data within a predetermined time period, it determines that uplink data transmission of the UE ends.

In the second implementation mode, after receiving the SR, the base station 1500 allocates to the UE scheduling information for transmitting uplink data, and transmits to the UE a UL grant indicating the scheduling information, so that the UE may transmit to the base station the uplink data by employing the scheduling information allocated by the base station 1500.

Similarly, the base station 1500 may repeatedly allocate scheduling information for transmitting uplink data to the UE, and the base station 1500 may further comprise a transmitting unit (not shown), to transmit to the UE an UL grant indicating the scheduling information. Thus, the receiving unit 1510 may continuously receive uplink data transmitted by the UE. As described above, in the uplink data transmitted for the last time, the UE may explicitly or implicitly indicate whether uplink data transmission ends. Accordingly, the base station 1500 may determine whether uplink data transmission of the UE ends. For example, the base station 1500 may acquire that the data is the last uplink data by an end tag (for example, 1 bit) in the uplink data received from the UE, so as to determine that uplink data transmission ends. Alternatively, when the base station 1500 finds that it does not receive uplink data within a predetermined time period, it determines that uplink data transmission of the UE ends.

According to the first embodiment and the second embodiment of the present disclosure, power consumption and time delay during an uplink data transmission process can be reduced. Therefore, in the above-described process, overhead caused by the UE transmitting the BSR and/or the base station transmitting the UL grant can be reduced.

It should be noted that block diagrams used for the illustration of the above embodiments represent functional blocks in functional units. These functional blocks (components) are realized by any combination of hardware and/or software. In addition, the means for implementing respective function blocks is not particularly limited. That is, respective functional blocks may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 16:
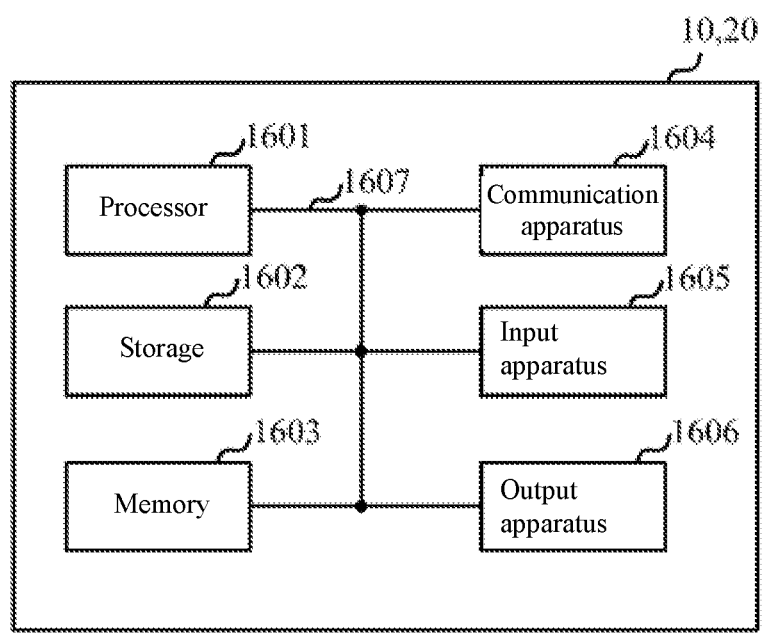
FIG. 16 is a diagram showing an example of a hardware structure of a radio base station and a user terminal involved in one implementation of the present disclosure.

For example, the radio base station, user terminals and so on in one implementation of the present disclosure may function as a computer that executes the processes of the radio communication method of the present disclosure. FIG. 16 is a diagram that shows an example of a hardware structure of the user terminal according to one implementation of the present disclosure. The above described radio base station 10 and user terminal 20 may be physically designed as a computer apparatus including a processor 1601, a storage 1602, a memory 1603, a communication apparatus 1604, an input apparatus 1605, an output apparatus 1606, and a bus 1607 and the like.

It should be noted that, in the following description, the word "apparatus" may be replaced by "circuit", "device", "unit" and so on. It should be noted that the hardware structure of the radio base station 10 and the user terminal 20 may be designed to include one or more of each apparatus shown in the drawings, or may be designed not to include part of the apparatus.

For example, although only one processor 1601 is shown, a plurality of processors may be provided. Furthermore, processes may be implemented with one processor, or processes may be implemented either simultaneously or in sequence, or in different manners, on two or more processors. It should be noted that the processor 1601 may be implemented with one or more chips.

Each function of the radio base station 10 and the user terminal 20 is implemented by reading predetermined software (program) on hardware such as the processor 1601 and the memory 1602, so as to make the processor 1601 perform calculations, and by controlling the communication carried out by the communication apparatus 1604, and the reading and/or writing of data in the memory 1602 and the storage 1603.

The processor 1601 may control the whole computer by, for example, running an operating system. The processor 1601 may be configured with a central processing unit (CPU), which includes interfaces with peripheral apparatus, control apparatus, computing apparatus, a register and so on. For example, the transmitting unit (910, 1130, 1310), receiving unit (920, 1110, 1510), and the like described above may be implemented by the processor 1601.

Furthermore, the processor 1601 reads programs (program codes), software modules or data, from the storage 1603 and/or the communication apparatus 1604, into the memory 1602, and executes various processes according to these. As for the programs, programs to allow computers to execute at least part of the operations of the above-described embodiments may be used.

The memory 1602 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1602 may be referred to as a "register", a "cache", a "main memory" (primary storage apparatus) and so on. The memory 1602 can store executable programs (program codes), software modules and so on for implementing the radio communication methods according to embodiments of the present disclosure.

The storage 1603 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1603 may be referred to as "secondary storage apparatus."

The communication apparatus 1604 is hardware (transmitting/receiving device) for allowing inter-computer communication by using wired and/or wireless networks, and may be referred to as, for example, a "network device", a "network controller", a "network card", a "communication module" and so on. The communication apparatus 1604 may include a high frequency switch, a duplexor, a filter, a frequency synthesizer, and the like, in order to realize, for example, Frequency Division Duplex (FDD) and/or Time Division Duplex (TDD).

The input apparatus 1605 is an input device for receiving input from the outside (for example, a keyboard, a mouse, a microphone, a switch, a button, a sensor and so on). The output apparatus 1606 is an output device for allowing transmitting output to the outside (for example, a display, a speaker, an LED (Light Emitting Diode) lamp and so on). It should be noted that the input apparatus 1605 and the output apparatus 1606 may be provided in an integrated structure (for example, a touch panel).

Furthermore, these pieces of apparatus, including the processor 1601, the memory 1602 and so on are connected by the bus 1607 so as to communicate information. The bus 1607 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be installed with at least one of these pieces of hardware.

It should be noted that the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be referred to as a cell, a frequency carrier, a carrier frequency, or the like.

In addition, the radio frame may be composed of one or more periods (frames) in the time domain. Each of the one or more periods (frames) constituting the radio frame may also be referred to as a subframe. Moreover, a subframe may be composed of one or more slots in the time domain. The subframe may be a fixed length of time duration (e.g., 1 ms) that is independent of the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Furthermore, the slot may also be a time unit configured based on parameter. Furthermore, a slot may also include a plurality of microslots. Each microslot may be comprised of one or more symbols in the time domain. Furthermore, a microslot may also be referred as "a subframe".

A radio frame, a subframe, a slot, a microslot and a symbol all represent the time unit when transmitting signals. A radio frame, a subframe, a slot, a microslot and a symbol may also use other names that correspond to each other. For example, one subframe may be referred to as a "transmission time interval (TTI)", and a plurality of consecutive subframes may also be referred to as a "TTI", and one slot or one microslot may also be referred to as a "TTI." That is, a subframe and/or a TTI may be a subframe (1 ms) in existing LTE, may be a shorter period than 1 ms (for example, one to thirteen symbols), or may be a longer period of time than 1 ms. It should be noted that a unit indicating a TTI may also be referred to as a slot, a microslot, or the like instead of a subframe.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. It should be noted that the definition of TTIs is not limited to this.

TTIs may be channel-coded data packets (transport blocks), code blocks, and/or codeword transmission time units, or may be the unit of processing in scheduling, link adaptation and so on. It should be noted that, when a TTI is given, the time interval (e.g., the number of symbols) actually mapped to the transport block, code block, and/or codeword may also be shorter than the TTI.

It should be noted that, when one slot or one microslot is called a TTI, more than one TTI (i.e., more than one slot or more than one microslot) may also become the scheduled minimum time unit. Furthermore, the number of slots (the number of microslots) constituting the minimum time unit of the scheduling may be controlled.

A TTI having a time duration of 1 ms may be referred to as a "normal TTI" (TTI in LTE Rel. 8 to 12), a "standard TTI", a "long TTI", a "normal subframe", a "standard subframe", or a "long subframe", and so on. A TTI that is shorter than a normal TTI may be referred to as a "shortened TTI", a "short TTI", a "partial (or fractional) TTI", a "shortened subframe", a "short subframe", a "microslot", or a "short microslot" and so on.

It should be noted that, a long TTI (e.g., a normal TTI, a subframe, etc.) may be replaced with a TTI having a time duration exceeding 1 ms, and a short TTI (e.g., a shortened TTI, and so on) may also be replaced with a TTI having a TTI duration shorter than the long TTI and a TTI duration exceeding 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one microslot, one subframe or one TTI duration. One TTI and one subframe each may be comprised of one or more resource blocks, respectively. It should be noted that one or more RBs may also be referred to as a "physical resource block (PRB (Physical RB))", a "Sub-Carrier Group (SCG)", a "Resource Element Group (REG)", a "PRG pair", an "RB pair" and so on.

Also, a resource block may also be composed of one or more resource elements (RE). For example, one RE can be a radio resource area of a subcarrier and a symbol.

It should be noted that the above-described structures of radio frames, subframes, slots, microslots and symbols and so on are simply examples. For example, configurations such as the number of subframes included in a radio frame, the number of slots of each subframe or radio frame, the number or microslots included in a slot, the number of symbols and RBs included in a slot or microslot, the number of subcarriers included in an RB, the number of symbols in a TTI, the symbol duration and the cyclic prefix (CP) duration can be variously changed.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBS) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs).

In addition, notification of predetermined information (for example, reporting of "X") is not limited to explicit notification, but may be performed implicitly (for example, by not performing notification of the predetermined information, or by notification of other information).

Determination may be performed using a value (0 or 1) indicated by 1 bit, may be performed using a Boolean value (true or false), or may be performed by comparison of numerical values (for example, comparison with a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

The terms "Base Station (BS)", "radio base station", "eNB", "gNB", "cell", "sector", "cell group", "carrier" and "component carrier" herein are used interchangeably. A base station is sometimes referred to by a fixed station, a NodeB, an eNodeB (eNB), an access point, a transmission point, a reception point, a femto cell, a small cell, and the like.

A base station can accommodate one or more (e.g., three) cells (also referred to as sectors). When the base station accommodates a plurality of cells, an entire coverage region of the base station may be divided into a plurality of smaller regions, and each smaller region may also provide communication services by a base station subsystem (for example, a small indoor base station (a Remote Radio Head (RRH))). The term "cell" or "sector" refers to a part or the entirety of the coverage region of a base station and/or a base station subsystem that performs communication services in the coverage.

The terms "Mobile Station (MS)", "user terminal", "User Equipment (UE)" and "terminal" herein are used interchangeably. A base station is sometimes referred to by a fixed station, a NodeB, an eNodeB (eNB), an access point, a transmission point, a reception point, a femto cell, a small cell, and the like.

A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

In addition, the radio base station herein may also be replaced with a user terminal. For example, respective modes/embodiments of the present disclosure may be applied to a structure in which communication between a radio base station and a user terminal is replaced with (Device-to-Device (D2D)) communication among a plurality of user terminals. At this time, a function of the above-described radio base station 10 may be regarded as a function of a user terminal 20. In addition, words such as "uplink" and "downlink" may also be replaced with "side". For example, an uplink channel may also be replaced with a side channel.

Similarly, a user terminal herein may also be replaced with a radio base station. At this time, a function of the above-described user terminal 20 may be regarded as a function of the radio base station 10.

In this specification, it is assumed that a specific action performed by a base station is also performed by an upper node (upper node) thereof according to situations. Obviously, in a network composed of one or more network nodes having a base station, various actions performed for communication with the terminal may be performed by the base station, one or more network nodes other than the base station (for example, a Mobility Management Entity (MME), a Serving-Gateway (S-GW), etc., may be considered), or a combination thereof.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G; IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judging" and "determining" as used herein may encompass a wide variety of actions. For example, "judging" and "determining" may be interpreted to mean making judgements and determinations related to calculating, computing, processing, deriving, investigating, looking up (for example, searching a table, a database or some other data structure), ascertaining and so on. Furthermore, "judging" and "determining" may be interpreted to mean making judgements and determinations related to receiving (for example, receiving information), transmitting (for example, transmitting information), inputting, outputting, accessing (for example, accessing data in a memory) and so on. In addition, "judging" and "determining" as used herein may be interpreted to mean making judgements and determinations related to resolving, selecting, choosing, establishing, comparing and so on. In other words, "judging" and "determining" may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Although the present disclosure has been described in detail above, it should be obvious to a person skilled in the art that the present disclosure is by no means limited to the implementations described herein. The present disclosure can be implemented with various corrections and in various modifications, without departing from the spirit and scope of the present disclosure defined by the recitations of claims. Consequently, the description herein is provided only for the purpose of explaining examples, and should by no means be construed to limit the present disclosure in any way.

The invention claimed is:

1. A terminal comprising:
   a processor;
   a storage medium having computer program instructions stored thereon, wherein the computer program instructions, when executed by the processor, perform processing of:
   transmitting to a base station a schedule request (SR), wherein the schedule request indicates a volume of uplink data, wherein the volume of the uplink data is indicated by information bits in the schedule request, and the information bits for indicating the volume of the uplink data are padded in the schedule request;
   receiving, from the base station, an uplink grant indicating scheduling information for transmitting the uplink data, wherein the scheduling information is allocated by the base station according to the volume of the uplink data, the volume being determined by the schedule request; and
   transmitting to the base station the uplink data by employing the scheduling information,
   wherein the volume of the uplink data is further indicated by resources for transmitting the SR, and the resources for transmitting the SR include at least one type of time resources, frequency resources and code resources for transmitting the SR.

2. The terminal according to claim 1 wherein
   the SR indicates scheduling information for a buffer status report (BSR) and the BSR indicates the volume of the uplink data, and
   before receiving from the base station an uplink grant indicating scheduling information for transmitting uplink data, the processor is further configured to:
   transmit the BSR according to the scheduling information for the BSR indicated by the SR,
   wherein the scheduling information is allocated by the base station according to the volume of the uplink data indicated by the BSR received based on the scheduling information for the BSR.

3. The terminal according to claim 2 wherein the scheduling information for the BSR is indicated by information bits in the SR or resources for transmitting the SR, wherein the resources for transmitting the SR include at least one type of time resources, frequency resources and code resources for transmitting the SR.

4. The terminal according to claim 1, wherein the uplink data is a part of the whole uplink data to be transmitted by the terminal, and the processor is further configured to:
   indicate a volume of remaining uplink data to be transmitted by the terminal to the base station by the uplink data.

5. The terminal according to claim 4 wherein the processor is further configured to receive, from the base station, an uplink grant indicating scheduling information for transmitting the remaining uplink data, and the processor is further configured to transmit to the base station the remaining uplink data by employing the scheduling information.

6. The terminal according to claim 1 wherein the SR indicates whether a volume of the whole uplink data to be transmitted by the terminal is greater than a threshold.

7. The terminal according to claim 6 wherein whether a volume of whole uplink data to be transmitted by the terminal is greater than the threshold is indicated by information bits in the SR or resources for transmitting the SR, and the resources for transmitting the SR include at least one type of time resources, frequency resources and code resources for transmitting the SR.

8. The terminal according to claim 6 wherein,
   when the volume of the whole uplink data to be transmitted by the terminal is not greater than the threshold, the scheduling information for transmitting the uplink data is allocated by the base station according to the threshold, and
   when the volume of the whole uplink data to be transmitted by the terminal is greater than the threshold, the scheduling information for transmitting the uplink data is allocated by the base station according to the threshold, and the processor is further configured to indicate a volume of remaining uplink data to be transmitted by the terminal to the base station by the uplink data.

9. The terminal according to claim 8,
   when the volume of the whole uplink data to be transmitted by the terminal is greater than the threshold, the processor is further configured to receive, from the base station, an uplink grant indicating scheduling information for transmitting the remaining uplink data, and
   the processor is further configured to transmit to the base station the remaining uplink data by employing the scheduling information for transmitting the remaining uplink data.

10. The terminal according to claim 4 wherein,
    transmitting information on the volume of the remaining uplink data is indicated by employing information bits in the uplink data or by employing a scrambling sequence for scrambling the uplink data.

11. A terminal comprising:
    a processor;
    a storage medium having computer program instructions stored thereon, wherein the computer program instructions, when executed by the processor, perform processing of:
       transmitting to a base station a schedule request (SR), wherein information for a buffer status report (BSR) is indicated by resources on which the SR was transmitted and the BSR indicates a volume of uplink data, wherein the resources on which the SR was transmitted include at least one type of time resources, frequency resources and code resources on which the SR was transmitted;
       receiving, from the base station, an uplink grant indicating scheduling information for transmitting the uplink data, wherein the scheduling information is allocated by the base station according to the volume of the uplink data; and
       transmitting to the base station the uplink data by employing the scheduling information.

12. The terminal according to claim 11 wherein the uplink data is a part of the whole uplink data to be transmitted by the terminal, and the processor is further configured to:
    indicate a volume of remaining uplink data to be transmitted by the terminal to the base station by the uplink data.

13. The terminal according to claim 12, wherein the processor is further configured to receive, from the base station, an uplink grant indicating scheduling information for transmitting the remaining uplink data, and the processor is further configured to transmit to the base station the remaining uplink data by employing the scheduling information.

14. A method performed by a terminal, comprising:
    transmitting to a base station a schedule request (SR), wherein information for a buffer status report (BSR) is indicated by resources on which the SR was transmitted and the BSR indicates a volume of uplink data, wherein the resources on which the SR was transmitted include at least one type of time resources, frequency resources and code resources on which the SR was transmitted;
    receiving, from the base station, an uplink grant indicating scheduling information for transmitting the uplink data, wherein the scheduling information is allocated by the base station according to the volume of the uplink data; and
    transmitting to the base station the uplink data by employing the scheduling information.

15. The method according to claim 14, wherein the uplink data is a part of the whole uplink data to be transmitted by the terminal, and the method further comprising:
    indicating a volume of remaining uplink data to be transmitted by the terminal to the base station by the uplink data.

16. The method according to claim 15, wherein the method further comprising: receiving, from the base station, an uplink grant indicating scheduling information for transmitting the remaining uplink data; and transmitting to the base station the remaining uplink data by employing the scheduling information.

* * * * *